US008107820B2

(12) United States Patent
Hotchkiss et al.

(10) Patent No.: US 8,107,820 B2
(45) Date of Patent: Jan. 31, 2012

(54) SYSTEMS AND METHODS FOR THE INTEGRATION OF FRAMING, OAM&P, AND FORWARD ERROR CORRECTION IN SFP OPTICAL TRANSCEIVER DEVICES

(75) Inventors: Adam R Hotchkiss, Richardson, TX (US); Siraj Nour El-Ahmadi, Dallas, TX (US); Salam El Ahmadi, Dallas, TX (US)

(73) Assignee: Menara Networks, Inc., Dallas, TX (US)

( * ) Notice: Subject to any disclaimer, the term of this patent is extended or adjusted under 35 U.S.C. 154(b) by 824 days.

(21) Appl. No.: 12/120,149

(22) Filed: May 13, 2008

(65) Prior Publication Data

US 2009/0103926 A1  Apr. 23, 2009

Related U.S. Application Data

(63) Continuation-in-part of application No. 11/581,201, filed on Oct. 13, 2006, now Pat. No. 7,580,637.

(60) Provisional application No. 61/029,821, filed on Feb. 19, 2008.

(51) Int. Cl.
*H04B 10/00* (2006.01)
(52) U.S. Cl. .......... 398/135; 398/138; 398/128
(58) Field of Classification Search .......... 398/135, 398/138, 139, 128, 130
See application file for complete search history.

(56) References Cited

U.S. PATENT DOCUMENTS

| | | | | |
|---|---|---|---|---|
| 7,286,487 B2* | 10/2007 | Perkins et al. | | 370/253 |
| 7,286,762 B2 | 10/2007 | Elahmadi et al. | | |
| 7,342,460 B2* | 3/2008 | Batchelor et al. | | 331/16 |
| 7,440,702 B2* | 10/2008 | Imai | | 398/141 |
| 2004/0030965 A1 | 2/2004 | Hadjihassan et al. | | |
| 2004/0033079 A1 | 2/2004 | Sheth et al. | | |
| 2004/0159776 A1 | 8/2004 | Richard et al. | | |
| 2005/0063711 A1 | 3/2005 | Rossi et al. | | |
| 2007/0122148 A1 | 5/2007 | Welch et al. | | |
| 2008/0050074 A1* | 2/2008 | Dallesasse et al. | | 385/92 |

OTHER PUBLICATIONS

Mark Telford; Shrinking Transceivers Drive InP Integration; Technical Feature—InP Circuit Integration—PCT/US2007/008848 Apr. 4, 2008; III-Vs Review the Advanced Semiconductor Magazine; vol. 16—No. 5, Jun./Jul. 2003.

Kazuhiko Terada, Kenji Kawai, Osamu Ishida, Keiji Kishine, Nobaru Iwasaki and Haruhiko Ichino; Physical Layer OAM&P Signaling Method for 10 Gbit/s Ethernet Transport over Optical Networks; Paper; IEICE Trans. Commun., vol. E 88 8, No. 10, Oct. 2005.

MSA Group Members; A Cooperation Agreement for 10 Gigabit Ethernet Transceiver Package; Issue 3.0, Sep. 18, 2002; XENPAK MSA.

(Continued)

*Primary Examiner* — M. R. Sedighian
(74) *Attorney, Agent, or Firm* — Clements Bernard PLLC; Lawrence A. Baratta, Jr.; Christopher L. Bernard

(57) ABSTRACT

The present invention provides systems and methods for integrated framing functionality; optical layer operations, administration, maintenance, and provisioning (OAM&P); forward error correction (FEC); data encapsulation; and performance enhancement support in SFP optical transceiver modules. An SFP pluggable transceiver is configured to frame a client signal and to provide OAM&P functionality, such as with G.709 framing. The SFP pluggable transceiver operates within existing multi-source agreement (MSA) specifications for SFP. Accordingly, the pluggable transceiver can operate in any customer device compliant to the MSA specifications.

17 Claims, 25 Drawing Sheets

OTHER PUBLICATIONS

MSA Group Members; A Cooperation Agreement for a Small Versatile 10 Gigabit Transceiver Package—Issue 2.0b, Apr. 7, 2005; X2 MSA, Zenpak MSA.

Simon Stanley; 10-Gbit/s Ethernet Components—Session 11, 10-Gig Ethernet Transponders; Driving Growth in the Enterprise Presentation; Aug. 17, 2004.

\* cited by examiner

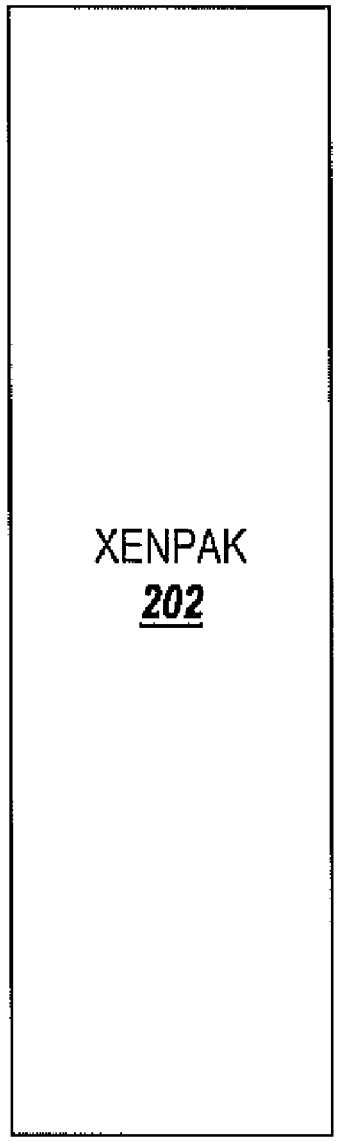
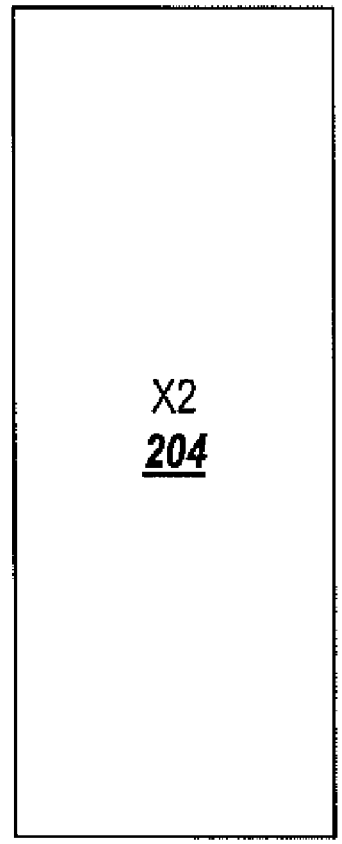
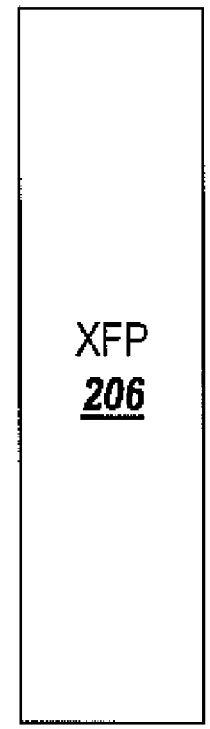
FIG. 4.

| Interface Provisioning<br>Commissioning and Acceptance | Alarming<br>Field Ops and Troubleshooting | Performance Monitoring<br>End to End SLAs |
|---|---|---|
| Traffic Provisioning<br>• FEC On/Off<br><br>Maintenance Activity<br>• Loopback towards DWDM Line or Host<br>• PRBS On/Off<br><br>Trace<br>• Tx Trace (16-bits)<br>• Rx Expected Trace<br>• Trace Check On/Off | G.709 Standard Backward Alarming<br>• BDI Local Receive<br><br>Remotely Fetched Alarms<br>• FE-LOS/LOF<br>• FE-FCE Degrade<br>• FE-FCE Excessive<br>• FE-AIS<br>• Loss of Comms<br>• FE-TIM<br><br>FE = Far End<br>FCE = FEC Corrected Error<br>TIM = Trail Identifier Mismatch | Far End PMs derived from Overhead Link (ODU)<br>• FE-EB (Errored Blocks)<br>• FE-ES (Errored Seconds)<br>• FE-SES (Severely ES)<br>• FE-UAS (Unavailable Sec)<br><br>FEC Errors communicated over comms channel<br>• FE-FCE (Corrected Errors)<br>• FE-FCER (Corrected BER)<br><br>FECR = FEC Corrected Error Ratio (BER) |

| Item | Value |
|---|---|
| Form Factor | SFP MSA, SFP+ MSA |
| Bit Rates | 155M to 8G (SFP)<br>155M to 11.3G (SFP+) |
| Tx Options | 850nm (Uncooled)<br>1310nm (Uncooled)<br>1550nm Grey (Uncooled)<br>CWDM (Uncooled)<br>DWDM |
| Rx Options | PIN and APD |
| Dispersion Tolerance | 120km, 180km, 360km |
| Link Budget | 20dB, 28dB, 32dB |
| Power Supply | 3.3V |
| Product Compatibility | Ethernet switches, IP Routers, MSPPs, SAN Directors, CPE Demarc |

*FIG. 24.*

| Payload Bit Rate (Gbps) | Function | G.709 OTU bitrate (255/237) (Gbps) | G.709 OTU bitrate (255/238) (Gbps) |
|---|---|---|---|
| 0.15552 | OC-3/STM-1 | 0.16733 | 0.16663 |
| 0.62208 | OC-12/STM-4 | 0.66933 | 0.66651 |
| 1.0625G | 1G Fibre Channel | 1.1432 | 1.1384 |
| 1.25G | 1GbE | 1.3449 | 1.3393 |
| 2.125G | 2G Fibre Channel | 2.2864 | 2.2786 |
| 2.488G | OC-48/STM-16 | 2.6773 | 2.6661 |
| 4.25G | 4G Fibre Channel | 4.5728 | 4.5536 |

FIG. 25.

SYSTEMS AND METHODS FOR THE INTEGRATION OF FRAMING, OAM&P, AND FORWARD ERROR CORRECTION IN SFP OPTICAL TRANSCEIVER DEVICES

CROSS-REFERENCE TO RELATED APPLICATION(S)

The present non-provisional patent application claims priority to U.S. Provisional Patent Application Ser. No. 61/029,821, filed Feb. 19, 2008, and entitled "SYSTEMS AND METHODS FOR ETHERNET EXTENSION AND DEMARCATION," which is incorporated in full by reference herein. Further, the present non-provisional patent application is a continuation-in-part of commonly assigned U.S. patent application Ser. No. 11/581,201, filed on Oct. 13, 2006, and entitled "SYSTEMS AND METHODS FOR THE INTEGRATION OF FRAMING, OAM&P, AND FORWARD ERROR CORRECTION IN PLUGGABLE OPTICAL TRANSCEIVER DEVICES," which is incorporated in full by reference herein.

FIELD OF THE INVENTION

The present invention relates generally to optical and data networking, and more specifically to systems and methods for integrated framing functionality; optical layer operations, administration, maintenance, and provisioning (OAM&P); forward error correction (FEC); data encapsulation; and performance enhancement support in small form factor pluggable (SFP) optical transceiver modules.

BACKGROUND OF THE INVENTION

Pluggable transceivers are defined through multi-source agreements (MSAs). MSAs are agreements for specifications of pluggable transceivers agreed to by two or more vendors and promulgated for other vendors and network operators to utilize. MSAs allow other vendors to design transceivers to the same specifications reducing risk for vendors and operators, increasing flexibility, and accelerating the introduction of new technology. Exemplary MSAs include XFP, XPAK, XENPAK, X2, XFP-E, SFP, and SFP+. Additionally, new MSAs are emerging to address new services and advanced technology. Each MSA defines the transceiver's mechanical characteristics, management interfaces, electrical characteristics, optical characteristics, and thermal requirements. Because of MSA specifications, MSA-compliant pluggable transceivers are standardized among equipment vendors and network operators to support multiple sources for pluggable transceivers and interoperability. As such, MSA-compliant pluggable transceivers have become the dominant form of optical transmitters and receivers in the industry.

Advantageously, MSA-compliant pluggable transceivers ensure engineering re-use and compatibility between various applications and the physical media dependent transceivers. Further, equipment vendors realize streamlined manufacturing and inventory control by removing wavelength specific decisions from the manufacturing process. For example, all line cards are manufactured the same, and the pluggable transceiver module with the desired wavelength (e.g. 850 nm, 1310 nm, 1550 nm, coarse wave division multiplexed (CWDM), dense wave division multiplexed (DWDM), etc.) is plugged in as a function of the specific application or development configuration. Network operators and service providers have adopted pluggable transceivers to reduce sparing costs. Further, significant cost reductions are realized by MSA standardization of pluggable transceivers because of multiple independent manufacturing sources.

The MSA specifications tightly define the mechanical characteristics, management interfaces, electrical characteristics, optical characteristics, and thermal requirements of pluggable transceivers. Advantageously, this enables interoperability among equipment vendors of pluggable transceivers, i.e. any MSA-compatible pluggable transceiver can be used in any host system designed to the MSA specification; however, these tightly defined characteristics limit the performance of pluggable transceivers since the MSA specifications were designed to maximize density and minimize cost, and not to provide advanced optical performance. To date, pluggable transceivers such as XFP, XPAK, XENPAK, X2, XFP-E, SFP, and SFP+ have been limited to short reach (less than 80 km) point-to-point applications without the need for high performance, extended reach, or advanced optical layer OAM&P. The MSA specifications have not addressed performance enhancements to enable pluggable transceivers to extend reach beyond 80 km and to provide carrier-grade optical management and performance. Where required to extend reach and to provide carrier-grade management and performance, host devices are designed with external circuitry interfaced to pluggable transceivers or pluggable transceivers are connected to optical transponders. As such, the use of pluggable transceivers to date has been limited to intra-office connections, short reach enterprise and metro networks (less than 80 km), and connection to an optical transponder capable of extended reach typically beyond 80 km.

Due to the low-cost, high-density, and widespread deployment of pluggable transceivers, both equipment vendors and network operators recognize a need to extend the benefits of pluggable transceivers to metro, regional and core network applications to enable carrier-grade wavelength division multiplexed (WDM) transport without the need for additional equipment such as optical transponders or additional circuitry performance enhancements. Such a need also must preserve the MSA mechanical characteristics, management interfaces, electrical characteristics, optical characteristics, and thermal requirements to maintain interoperability with existing host systems.

Ethernet services are proliferating from local area network (LAN)-based services to corporate wide area network (WAN)-based services all the way to service provider backbone-based services, i.e. Ethernet is becoming the protocol of choice for all network levels. As service providers move towards Ethernet as the predominate service, there has been movement in standards to develop Carrier Ethernet including Ethernet operations, administration, and maintenance (OAM). Standards include the Metro Ethernet Forum (MEF) certifications, IEEE 802.1ag Service Layer OAM (Connectivity Fault Management), IEEE 802.3ah Ethernet in the First Mile (EFM), IEEE 802.1aj Two Port MAC Relay. As OAM is introduced in Ethernet, a requirement has emerged to "demarcate" network points to enable testing, monitoring, service level agreements (SLA), and the like.

Referring to FIG. 1, an Ethernet extension application is illustrated in a conventional network 10. The network 10 includes an access/metro network 12 connected to a core data network 14 and customer premises equipment (CPE) 16. Alternatively, the CPE 16 could also be remote central office equipment or carrier extension, and CPE 16 is shown for illustration purposes. The access/metro network 12 can include a dense wave division multiplexed (DWDM) network operated by a service provider. For example, the access/metro network 12 can include multiple interconnect optical/data network elements (NEs) 18 each configured with line cards configured to provide services, such as Ethernet. The core data network 14 can include multi-protocol label switched (MPLS) routers 20 or the like. The CPE 16 can include a customer router/switch or the like.

Here, the service provider is providing Ethernet access from the CPE 16 to the core data network 14. Conventionally, demarcation devices 22 are required between the CPE 16 and the access/metro network 12 and between the core data network 14 and the access/metro network 12. Under MEF Carrier Ethernet terminology, the demarcation devices 22 are a user network interface (UNI) or a network to network interface (NNI). The UNI and NNI are physical Ethernet interfaces operating at 10 Mbs, 100 Mbps, 1 Gbps, 10 Gbps, etc. provided by the service provider. UNI is used between a CPE and the access/metro network 12, and NNI is used between the access/metro network 12 and the core data network 14. The UNI and NNI are necessary to enable testing and monitoring of Ethernet services provided to the CPE 16 and the core data network 14. The demarcation devices 22 effectively provide separation in terms of management, alarms, physical location, and the like between networks.

For the access/metro network 12, service providers are moving towards ITU-T G.709-compliant interfaces to provide transparency and carrier-grade OAM&P of wavelength and Ethernet services. ITU-T Recommendation G.709 (Interface for the optical transport network (OTN)) is an example of a framing and data encapsulation technique. G.709 is a standardized method for managing optical wavelengths in an optical network. G.709 allows for transparency in wavelength services, improvement in optical link performance through out-of-band forward error correction (FEC), improved management through full transparency, and interoperability with other G.709 clients. G.709 defines a wrapper in which a client signal (e.g. OC-48, STM-16, OC-192, STM-64, 1 GbE, 10 GbE, etc.) is encapsulated. The G.709 wrapper includes overhead bytes for optical layer OAM&P and FEC overhead for error correction. Traditionally, G.709 signals are used in a carrier-grade network to provide robust performance and OAM&P while transporting client signals with full transparency.

Disadvantageously, the demarcation devices 22 are often 10 Gbps and 2.5 Gbps G.709 transponders or externally mounted and managed layer ½ termination devices to interface the access/metro network 12. Here, the CPE 16 requires an expensive transponder or external demarcation devices to be collocated to provide Ethernet extension from the access/metro network 12 and to provide demarcation functionality. The transponder interfaces in one direction to the access/metro network 12 utilizing G.709 framing and to the CPE 16 utilizing standard Ethernet rates. Additionally, this adds an extra layer of optical-electrical conversions requiring an interface from the transponder at the CPE 16 to the CPE 16 itself.

It would be advantageous to provide a solution for Ethernet extensions and demarcations that utilize the advantages of ITU-T G.709 without requiring extra equipment and costs.

BRIEF SUMMARY OF THE INVENTION

In various exemplary embodiments, the present invention provides systems and methods for integrated framing functionality; optical layer operations, administration, maintenance, and provisioning (OAM&P); forward error correction (FEC); data encapsulation; and performance enhancement support in SFP optical transceiver modules. An SFP pluggable transceiver is configured to frame a client signal and to provide OAM&P functionality, such as with G.709 framing.

The SFP pluggable transceiver operates within existing multi-source agreement (MSA) specifications for SFP. Accordingly, the pluggable transceiver can operate in any customer device compliant to the MSA specifications.

In an exemplary embodiment of the present invention, a small form factor pluggable optical transceiver includes an optical assembly; an encoder/decoder circuit connected to the optical assembly; a timing circuit connected to the encoder/decoder circuit; a module housing comprising a serial interface connected to the encoder/decoder circuit, wherein the optical assembly, the encoder/decoder circuit, and the timing circuit are located within the module housing. The small form factor pluggable optical transceiver is compliant to the small form factor pluggable multi-source agreement; and the encoder/decoder circuit preserves specifications associated with the small form factor pluggable multi-source agreement. The encoder/decoder circuit is configured to frame/un-frame a client signal from/to a host device through the serial interface. Optionally, the client signal is framed/un-framed utilizing non-standard Optical Transport Network rates. The non-standard Optical Transport Network rates can include one of 255/237 and 255/238 bit rates. The 255/237 bit rate includes an OTU2 type frame with 64 byte stuffing per OTU2 frame, and the 255/238 bit rate includes an OTU1 type frame without byte stuffing. The encoder/decoder circuit can be further configured to encode/decode forward error correction information on the framed/un-framed client signal. Optionally, the encoder/decoder circuit is further configured to provide operations, administration, maintenance, and provisioning functionality through overhead associated with the non-standard Optical Transport Network rates. The small form factor pluggable optical transceiver can further include an I2C management interface configured to provide communication between the small form factor pluggable optical transceiver and the host device; wherein the encoder/decoder circuit is further configured to communicate operations, administration, maintenance, and provisioning information to/from the host device utilizing unused registers in the I2C management interface.

In another exemplary embodiment of the present invention, an encoder/decoder circuit integrated within a small form factor pluggable optical transceiver includes a first interface connected to a serial interface, wherein the serial interface is configured to communicate a client signal from a host device; a second interface connected to an optical assembly, wherein the serial interface, the optical assembly, and the encoder/decoder circuit are contained within the small form factor pluggable optical transceiver; and circuitry connected to the first interface and the second interface. The circuitry is configured to frame/un-frame the client signal; wherein the small form factor pluggable optical transceiver is compliant to the small form factor pluggable multi-source agreement; and wherein the encoder/decoder circuit preserves specifications associated with the small form factor pluggable multi-source agreement. The client signal can be framed/un-framed utilizing non-standard Optical Transport Network rates. The non-standard Optical Transport Network rates utilize one of 255/237 and 255/238 bit rates. The 255/237 bit rate includes an OTU2 type frame with 64 byte stuffing per OTU2 frame, and wherein the 255/238 bit rate includes an OTU1 type frame without byte stuffing. Optionally, the circuitry is further configured to encode/decode forward error correction information on the framed/un-framed client signal. The circuitry can be further configured to provide operations, administration, maintenance, and provisioning functionality through overhead associated with the non-standard Optical Transport Network rates. The encoder/decoder circuit can further include an I2C management interface configured to provide communication between the small form factor pluggable optical transceiver and the host device; wherein the circuitry is further configured to communicate operations, administration, maintenance, and provisioning information to/from the host device utilizing unused registers in the I2C management interface.

In yet another exemplary embodiment of the present invention, a method of transporting a client signal with a small form factor pluggable optical transceiver includes receiving at a serial interface a client signal from a host device; framing the client signal utilizing a non-standard Optical Transport Network rate; and transmitting the framed client signal with an optical assembly; wherein the small form factor pluggable optical transceiver is compliant to the small form factor pluggable multi-source agreement; and wherein the framing step preserves specifications associated with the small form factor pluggable multi-source agreement. The method can further includes encoding the framed client signal with forward error correction information; wherein the encoding step preserves specifications associated with the small form factor pluggable multi-source agreement. Optionally, the method further includes receiving a signal from the optical assembly; unframing the received signal; and providing the unframed received signal to the serial interface; wherein the unframing step preserves specifications associated with the small form factor pluggable multi-source agreement. The non-standard Optical Transport Network rates utilize one of 255/237 and 255/238 bit rates, wherein the 255/237 bit rate includes an OTU2 type frame with 64 byte stuffing per OTU2 frame, and wherein the 255/238 bit rate includes an OTU1 type frame without byte stuffing.

BRIEF DESCRIPTION OF THE DRAWINGS

The present invention is illustrated and described herein with reference to the various drawings, in which like reference numbers denote like method steps and/or system components, respectively, and in which:

FIG. 4 is a block diagram illustrating several MSA specifications for pluggable optical transceivers including XENPAK, X2, and XFP;

FIG. 21 is a table illustrating exemplary remote demarcation OAM&P functions available through pluggable transceivers according to an exemplary embodiment of the present invention;

FIG. 24 is a table illustrating exemplary specifications for the SFP transceiver in FIG. 23 according to an exemplary embodiment of the present invention; and FIG. 25 is a table illustrating exemplary OTN bit rates utilized for various signal rates associated with SFP transceivers according to an exemplary embodiment of the present invention.

DETAILED DESCRIPTION OF THE INVENTION

In various exemplary embodiments, the present invention provides systems and methods for integrated framing functionality; optical layer operations, administration, maintenance, and provisioning (OAM&P); forward error correction (FEC); data encapsulation; and performance enhancement support in SFP optical transceiver modules. An SFP pluggable transceiver is configured to frame a client signal and to provide OAM&P functionality, such as with G.709 framing. The SFP pluggable transceiver operates within existing multi-source agreement (MSA) specifications for SFP. Accordingly, the pluggable transceiver can operate in any customer device compliant to the MSA specifications.

Figure 2:
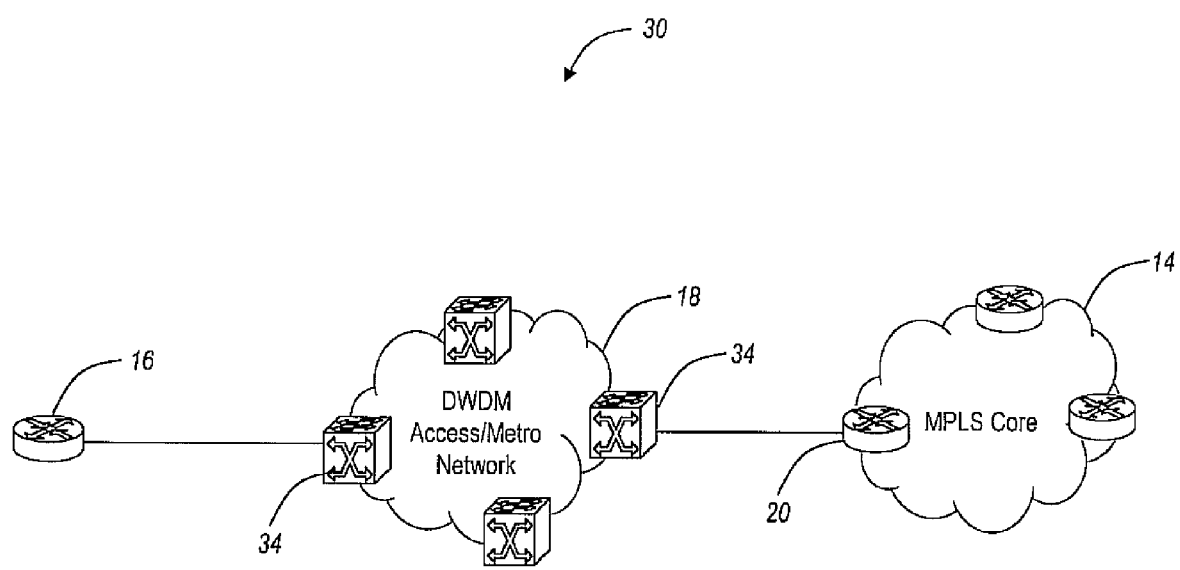
FIG. 2 is a network diagram of an Ethernet extension application in a network utilizing pluggable optical transceivers for demarcation according to an exemplary embodiment of the present invention.

Referring to FIG. 2, an Ethernet extension application is illustrated in a network 30 utilizing pluggable optical transceivers for demarcation according to an exemplary embodiment of the present invention. The network 30 includes an access/metro network 32 connected to a core data network 14 and customer premises equipment (CPE) 16. The access/metro network 32 includes multiple interconnect optical/data network elements (NEs) 34 each configured with line cards configured to provide services, such as Ethernet. The core data network 14 can include multi-protocol label switched (MPLS) routers 20 or the like. The CPE 16 can include a customer router/switch or the like.

The CPE 16 is shown for illustration purposes, and those of ordinary skill in the art will recognize a remote router/switch, a backhaul device, and the like can also be utilized in the Ethernet extension/demarcation applications described herein. Additionally, the present invention is described with respect to Ethernet demarcation as an exemplary embodiment. Those of ordinary skill in the art will recognize the present invention can also be used for SONET/SDH CPEs or remote COs, for Fibre Channel, and other applications.

The NEs 34 can include G.709 compliant interfaces connected to pluggable transceivers in the CPE 16 and the router 20. The CPE 16 and the router 20 are both configured to utilize MSA-defined pluggable transceivers. MSAs are agreements for specifications of pluggable transceivers agreed to by two or more vendors and promulgated for other vendors and network operators to utilize. MSAs allow other vendors to design transceivers to the same specifications reducing risk for vendors and operators, increasing flexibility, and accelerating the introduction of new technology. Exemplary MSAs include XFP, XPAK, XENPAK, X2, XFP-E, SFP, and SFP+. Additionally, new MSAs are emerging to address new services and advanced technology. Each MSA defines the transceiver's mechanical characteristics, management interfaces, electrical characteristics, optical characteristics, and thermal requirements. Because of MSA specifications, MSA-compliant pluggable transceivers are standardized among equipment vendors and network operators to support multiple sources for pluggable transceivers and interoperability. As such, MSA-compliant pluggable transceivers have become the dominant form of optical transmitters and receivers in the industry. The MSA specifications also define vendor-specific management registers to allow vendors to implement additional features within the MSA pluggable while maintaining MSA compliance.

Figure 1:
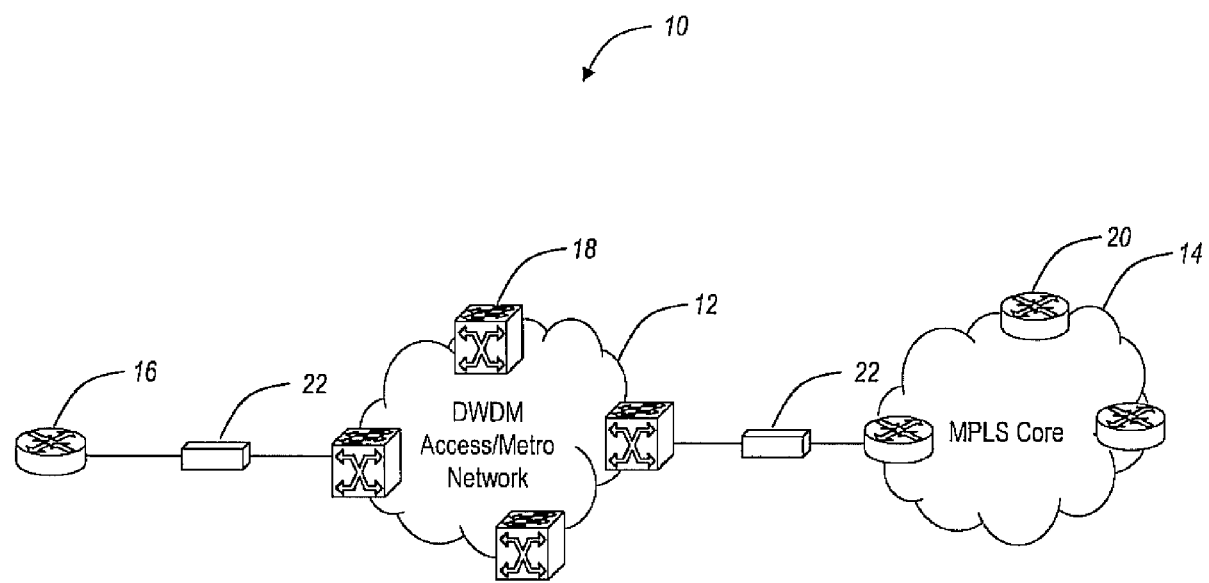
FIG. 1 is a network diagram of an Ethernet extension application in a conventional network.

In the present invention, the pluggable transceivers in the CPE 16 and the router 20 include additional circuitry to provide demarcation, such as through G.709. However, the pluggable transceivers are still configured to operate within MSA specifications, i.e. the additional circuitry provides the demarcation functionality while preserving the MSA operating specifications. Effectively, the pluggable transceivers remove the requirements for the demarcation devices 22 in FIG. 1 and for any other external equipment (e.g., transponders). Advantageously, the present invention preserves CPE 16 demarcation functionality and SLA capabilities while removing extra equipment and cost. This enables capital cost savings, footprint savings, power savings, and installation/turn-up savings.

Figure 3A:
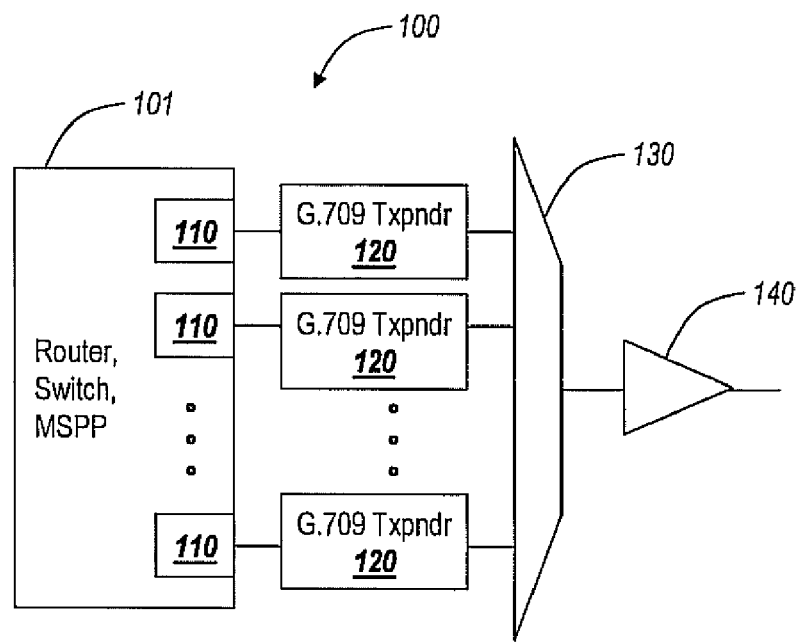
FIGS. 3*a*-3*b* are block diagrams of pluggable transceivers included on devices for wavelength division multiplexed (WDM) transmission into a multiplexer and an amplifier.
Figure 3B:
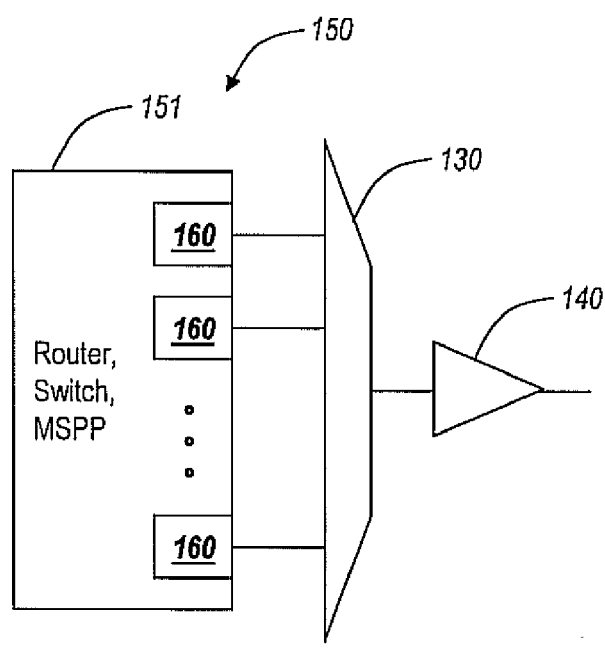

Referring to FIGS. 3a-3b, pluggable transceivers 110,160 can be included on devices 101,151 for wavelength division multiplexed (WDM) transmission into a multiplexer 130 and an amplifier 140, according to an exemplary embodiment of the present invention. The devices 101,151 can include servers, routers, Ethernet switches, multi-service provisioning platforms (MSPPs), optical cross-connects, or any other device with requirements for optical transmission. The pluggable transceivers 110,160 are configured to plug into a line card, blade, or other device in the devices 101,151 to provide an optical signal for transmission. The pluggable transceivers 110,160 are designed to specifications such that they can be installed in any device 101,151 designed to host a pluggable transceiver 110,160. These specifications allow the design of the devices 101,151 to be de-coupled from the design of pluggable transceivers 110,160. Alternatively, the pluggable transceivers 110,160 can also be used for single wavelength applications, i.e. non-WDM transmission. Further, the pluggable transceivers 110,160 can also be interfaced to a transponder client with the transponder client having access to the far-end client.

FIG. 3a illustrates the prior art with the device 101 equipped with pluggable transceivers 110 where the transceivers 110 are designed to support native optical line rates such as 9.96 Gbps for SONET OC-192 and SDH STM-64, 10.3 Gbps for GbE LAN PHY, and 10.5 Gbps for 10 G Fiber Channel. Further, the transceivers 110 do not support G.709 wrappers, FEC, and optical layer OAM&P integrated within the transceiver 110. The transceivers 110 are configured to accept an electrical signal and to convert it to an optical signal without additional functions such as adding G.709 overhead, processing G.709 management bytes, encoding FEC overhead, etc. As such, devices 101 equipped with transceivers 110 require transponders such as G.709 transponders 120 to offer G.709 wrappers, FEC, and G.709/OTN OAM&P. The transceivers 110 typically provide un-amplified optical reach up to 80 km with no transparency and optical layer OAM&P.

The present invention provides G.709/OTN optical OAM&P based on the G.709 and OTN network principals. Existing, CPE boxes do have OAM&P, just not G.709 and OTN related. Likewise the standard XFPs do have LOS, CDR LOC, low power, loopback and fault alarms at layer 0. However, these are not sufficient for demarcation.

FIG. 3b illustrates an exemplary embodiment of the present invention with the device 151 equipped with pluggable transceivers 160 where the transceivers 160 include integrated G.709 wrapper, FEC, and OAM&P functionality. The transceivers 160 remove the need for external transponders to support G.709, FEC, and OAM&P by incorporating these functions internal to the transceiver 160 while maintaining the same interface to the device 151 as the transceiver 110 does with the device 101. This is done by adding the G.709 wrapper, FEC, and OAM&P within the specifications of the transceiver 110.

Transceivers 160 extend the OTN framework benefits for seamless interconnection applications and for OAM&P functions necessary for metro, regional, and core applications. Further, the transceivers 160 are configured to transparently transport asynchronous traffic such as IEEE 802.3 10 Gigabit Ethernet (10 GbE), 10 Gbps Fiber Channel traffic, or any 10 Gbps constant bit-rate (CBR) traffic seamlessly and efficiently across multiple networks using the OTN framework. This removes the need to sacrifice bandwidth utilization such as in SONET concatenation or the need to introduce another layer of adaptation such as generic framing procedure (GFP). Some vendors also want GFP mapping to limit the bandwidth to SONET/SDH rates, and the transceivers 160 can rate limit the client traffic to provide rate compatibility to other G.709 OTN systems, if required.

ITU-T Recommendation G.709 (Interface for the optical transport network (OTN)) is an example of a framing and data encapsulation technique. G.709 is a standardized method for managing optical wavelengths in an optical network. G.709 allows for transparency in wavelength services, improvement in optical link performance through out-of-band forward error correction (FEC), improved management through full transparency, and interoperability with other G.709 clients.

G.709 defines a wrapper in which a client signal (e.g. OC-48, STM-16, OC-192, STM-64, 10 GbE, 1 GbE, etc.) is encapsulated. The G.709 wrapper includes overhead bytes for optical layer OAM&P and FEC overhead for error correction. Traditionally, G.709 signals are used in a carrier-grade network to provide robust performance and OAM&P while transporting client signals with full transparency. Currently, MSA specifications such as XFP, XPAK, XENPAK, X2, XFP-E, SFP, and SFP+ do not address integration of G.709 within the pluggable transceiver.

Referring to FIG. 4, several MSA specifications currently exist for pluggable optical transceivers including XENPAK 202, X2 204, and XFP 206. Power and space is limited in each of the specifications in FIG. 4. The pluggable MSAs were developed with intent to maximize port density; hence the power and foot-print constraints. The intent of the MSA specifications was to have framing, G.709, FEC, and OAM&P reside outside the pluggable transceiver. The XFP MSA, for example, states that the XFP transceiver must accept data input up to 11.1 Gbps FEC rate but not that the functions must be carried out inside the XFP due to the limited space and power available inside the XFP. However, these MSAs do not prevent the addition of additional functions such as G.709, FEC, and OAM&P internal to the pluggable transceiver. The present invention provides a system to integrate these functions while maintaining the MSA specifications through use of unused communication ports for OAM&P access and circuitry designed to fit within the space and power constraints of the MSA specification.

The XENPAK 202 MSA supports the proposed 802.3ae IEEE 10 Gigabit Ethernet (10 GbE) standard, and specifies a uniform form factor, size, connector type and electrical pin-outs. XENPAK 202 simplifies management of architecture shifts and integration, minimizes system costs, ensures multiple vendors for market supply, and guarantees thermal performance for high density 10 GbE ports. XENPAK 202 requires power dissipation of no more than 6 W for 1310 nm and 850 nm wavelengths and power dissipation of no more than 10 W for 1550 nm wavelengths. The XENPAK 202 MSA is available at www.xenpak.org/MSA.asp and is hereby incorporated by reference.

The X2 204 MSA defines a small form-factor 10 Gbps pluggable fiber optic transceiver optimized for 802.3ae Ethernet, ANSI/ITUT OC192/STM-64 SONET/SDH interfaces, ITU-T G.709, OIF OC192 VSR, INCITS/ANSI 10 GFC (10 Gigabit Fiber Channel) and other 10 Gigabit applications. X2 204 is physically smaller than XENPAK 202 but maintains the same electrical I/O specification defined by the XENPAK 202 MSA and continues to provide robust thermal performance and electromagnetic shielding. X2 204 uses the same 70-pin electrical connectors as XENPAK 202 supporting four wire XAUI (10-gigabit attachment unit interface). X2 204 supports an input signal of G.709, but does not support framing a non-G.709 signal internal to the pluggable transceiver and also does not support FEC and optical layer OAM&P. The X2 204 MSA is available at www.x2msa.org/MSA.asp and is hereby incorporate by reference.

The XFP (10 Gigabit Small Form Factor Pluggable) 206 is a hot-swappable, protocol independent optical transceiver, typically operating at 1310 nm or 1550 nm, for 10 Gigabit SONET/SDH, Fiber Channel, Gigabit Ethernet and other applications. The XFP 206 MSA is available from www.xfpmsa.org and is hereby incorporated by reference. The XFP 206 MSA defines a specification for a module, cage hardware, and IC interfaces for a 10 Gbps hot pluggable module converting serial electrical signals to external serial optical or electrical signals. The technology is intended to be flexible enough to support bit rates between 9.95 Gbps and 11.1 Gbps for services such as OC-192/STM-64, 10 G Fiber Channel, G.709, and 10 G Ethernet. XFP 206 supports native G.709 signals, but does not support the ability to frame a non-G.709 signal into a G.709 wrapper with FEC and OAM&P internal to the XFP 206 module. Currently, these features are done external to the XFP 206 module and a G.709 signal is sent to the XFP 206 module for optical transmission. XFP-E (not shown in FIG. 4) is an extension of the XFP 206 MSA for ultra-long haul DWDM applications and tunable optical transmitters.

XPAK (not shown in FIG. 4) is a reduced-size, pluggable 10 Gigabit Ethernet (GbE) module customized for enterprise, storage area network (SAN), and switching center market segment applications. The XPAK specifications define mechanical, thermal, and electromagnetic interference (EMI) mitigation features of the form factor, as well as reference 10-GbE optical and XENPAK 202 MSA electrical specifications. XPAK offers higher density and better power efficiency than XENPAK 202 and offers 10 GbE links up to 10 km and eventually 40 km.

The SFP+ (not shown in FIG. 4) MSA is a specification for a pluggable, hot-swappable optical interface for SONET/SDH, Fiber Channel, Gigabit Ethernet, and other applications. SFP+ is designed for up to 80 km reach and supports a full-range of applications. SFP+ is similar in size and power with the XFP 206 specification, and similarly accepts a serial electrical input.

The XFP, XPAK, XENPAK, X2, XFP-E, SFP, and SFP+ MSAs all share similar design constraints in power and space. Some of these MSAs have been designed to accept G.709 framed signals (i.e. 10.7 Gbps and 11.1 Gbps), but the MSAs do not disclose integrated G.709 framing, optical layer OAM&P, and FEC internal to the pluggable transceivers. MSAs define input signal interfaces, mechanical, thermal, and software management interfaces. The present invention introduces G.709 framing, OAM&P, and FEC without changing any of the MSA interfaces or mechanical characteristics.

Figure 5A:
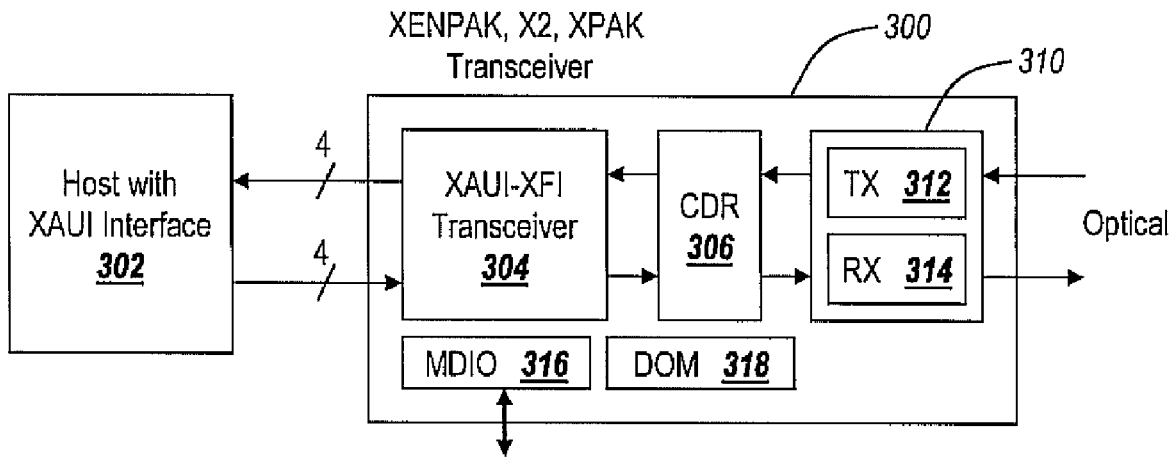
FIGS. 5*a*-5*b* are block diagrams of existing pluggable transceivers which do not include circuitry for data encapsulation, integrated G.709 framing, OAM&P, and FEC.
Figure 5B:
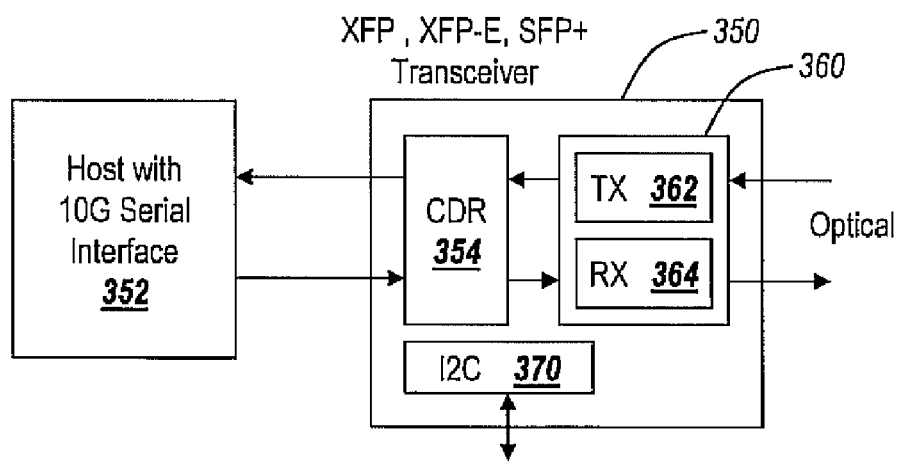

Referring to FIGS. 5a-5b, existing pluggable transceivers do not include circuitry for data encapsulation, integrated G.709 framing, OAM&P, and FEC. FIG. 5a illustrates a functional block diagram of a XENPAK, XPAK, and X2 pluggable transceiver 300, and FIG. 5b illustrates a functional block diagram of an XFP, XFP-E, and SFP+ pluggable transceiver 350.

In FIG. 5a, the XENPAK, XPAK, and X2 pluggable transceiver 300 includes an optical module 310 connected to a clock and data recovery (CDR) 306 module which is connected to a XAUI-XFI transceiver 304. Typically the CDR 306 can be integrated into the XAUI-XFI transceiver 304. The XAUI-XFI transceiver 304 is configured to connect to a host device with an XAUI interface 302. The host device includes a socket in which the pluggable transceiver 300 plugs into to connect to the host 302. XAUI is a 4×3.125 Gbps electrical connection compliant with the IEEE 802.3ae 10 GbE specification. XFI is a standard interface for connecting 10 Gig Ethernet MAC devices to an optical interface. The XAUI-XFI transceiver 304 includes multiplexer/demultiplexer functions and encoding/decoding functions to perform 8B/10B and 64B/66B coding. XAUI provides four lanes running at 3.125 Gbps using 8B/10B encoding and XFI provides a single lane running at 10.3125 Gbps using 64B/66B encoding. Additionally, the XAUI-XFI transceiver 304 can include a SONET framer called a WAN Interface Sublayer (WIS).

The XAUI-XFI transceiver 304 accepts the XAUI signal and converts it into a serial connection such as a 10.3125 Gbps XFI signal for transmission by the optical module 310.

The optical module 310 includes a transmitter (TX) 312 and a receiver (RX) 314. The TX/RX 312,314 can include 850 nm, 1310 nm, 1550 nm, DWDM, CWDM, and the like depending on the application requirements. The TX/RX 312, 314 connect to the CDR 306 module where a clock is generated by retrieving the phase information of an input signal and retiming occurs on an output signal. In some embodiments, the functionality of the CDR 306 is included in the XAUI-XFI transceiver 304. While the pluggable transceiver 300 provides functionality to convert between XAUI and XFI, the transceiver 300 does not include integrated G.709 framing, OTN layer OAM&P (e.g., ITU-T G.798, G.826, G.8201, etc.), and FEC functionality.

Additionally, the pluggable transceiver 300 includes management data input/output (MDIO) 316 and digital optical monitoring (DOM) 318 for communications and performance monitoring between the transceiver 300 and the host 302. MDIO 316 is a standard-driven, dedicated-bus approach that is specified by IEEE workgroup 802.3. The MDIO 316 interface is implemented by two pins, an MDIO pin and a Management Data Clock (MDC) pin. The MDIO 316 interface is defined in relationship to the accessing and modification of various registers within physical-layer (PHY) devices, and how they relate to connecting to media access controllers (MACs) in 1- and 10-Gbit/s Ethernet solutions. One MDIO 316 interface can access up to 32 registers, in 32 different devices. A device driving an MDIO 316 bus is called a station management entity (STA), and the device being managed by the STA is called the MDIO Manageable Device (MMD). The STA drives the MDC line. It initiates a command using an MDIO frame and provides the target register address. During a write command, the STA also provides the data. In the case of a read command, the MMD takes over the bus and supplies the STA with the data. DOM 318 is an optical monitoring scheme utilized by each MSA specification for performance monitoring on the pluggable transceiver. For example, the DOM 318 can provide performance monitoring data such as optical output power, optical input power, laser bias current, etc. While DOM 318 provides some performance monitoring capabilities, it does not provide OTN OAM&P capable of operating carrier-grade networks. DOM 318 provides component level performance monitoring information and DOM 318 does not provide optical link layer OAM&P.

In FIG. 5b, the XFP and XFP-E pluggable transceiver 350 includes a clock and data recovery (CDR) 354 module configured to accept a serial input from a host with a 10 G serial interface 352. The CDR 354 module generates a clock by retrieving the phase information of an input signal and retiming occurs on an output signal. The CDR 354 module connects to an optical module 360 which includes a transmitter (TX) 362 and a receiver (RX) 364. The TX/RX 362,364 can include 850 nm, 1310 nm, 1550 nm, DWDM, CWDM, and the like depending on the application requirements. Additionally, the pluggable transceiver 350 includes an inter-integrated circuit (I2C) 370 serial bus. I2C is a serial communications bus through which a pluggable transceiver 350, such as XFP, XFP-E, SFP, and SFP+, communicates to the host system. The pluggable transceiver 350 provides no multiplexer/demultiplexer or encoding/decoding functionality and solely provides an electrical to optical conversion of a signal. Similar to the XENPAK, XPAK, and X2 pluggable transceiver 300, the XFP, XFP-E, and SFP+ pluggable transceiver 350 provides no G.709 framing, OAM&P, and FEC functionality. Note, existing SFP and SFP+ pluggable transceivers are different. SFP pluggable transceivers do not include the CDR 354 and the CDR 354 is located in the host.

Figure 6A:
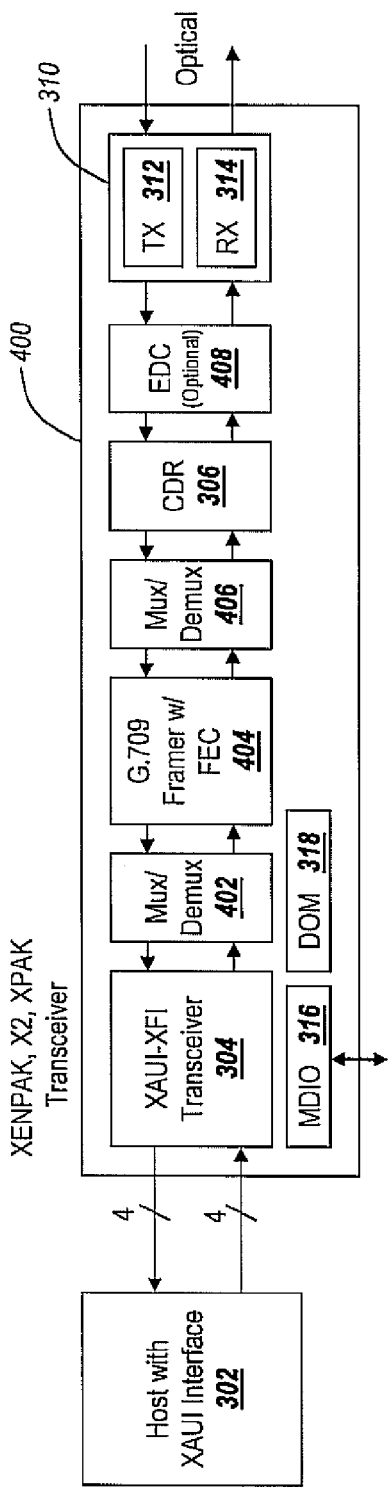
FIGS. 6*a*-6*b* are block diagrams of XENPAK, X2, and XPAK pluggable transceivers including integrated circuitry to perform G.709 framing, optical layer OAM&P, and FEC internal to the pluggable transceiver while preserving specifications of the XENPAK, X2, and XPAK MSAs.
Figure 6B:
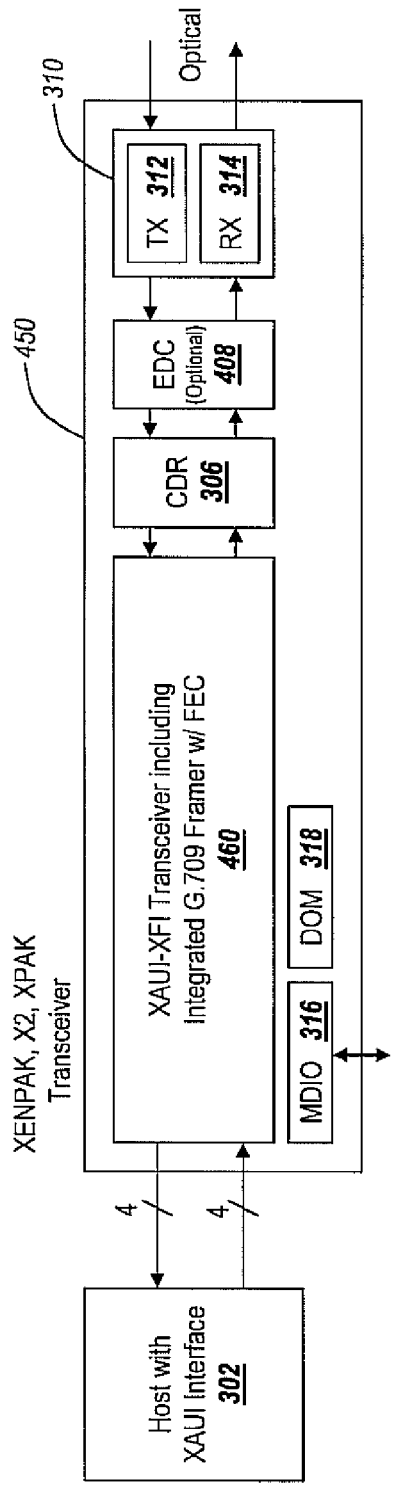

Referring to FIGS. 6a-6b, in one exemplary embodiment of the present invention, XENPAK, X2, and XPAK pluggable transceivers 400,450 include integrated circuitry to perform G.709 framing, optical layer OAM&P, and FEC internal to the pluggable transceiver 400,450 while preserving the power, space, and communication specifications of the XENPAK, X2, and XPAK MSAs. FIG. 6a illustrates a pluggable transceiver 400 with G.709 framing circuitry external to a XAUI-XFI transceiver 304. FIG. 6b illustrates a pluggable transceiver 450 with G.709 framing circuitry integrated within a XAUI-XFI transceiver 460. Optionally, both pluggable transceivers 400,450 can also include an electrical dispersion compensation (EDC) 408 module.

In FIG. 6a, the pluggable transceiver 400 includes the same functionality as the pluggable transceiver 300 in FIG. 5a with a XAUI-XFI transceiver 304, a CDR 306 module, an optical module 310, MDIO 316, and DOM 318. Additionally, the pluggable transceiver 400 includes a G.709 framer with FEC 404 which is configured to frame an input signal to the transceiver 400 with a G.709 compliant frame. Further, the G.709 framer 404 is configured to provide optical layer OAM&P on the G.709 frame and to provide FEC through the G.709 frame. Additionally the EDC 408 can be located behind the CDR 306 for some designs.

The pluggable transceiver 400 includes two multiplexers/de-multiplexers 402,406 connected to the G.709 framer with FEC 404. The input and output from the XAUI-XFI transceiver 304 is a 10 Gbps XFI signal. The multiplexer/de-multiplexer 402 is configured to adapt the input and output from the XAUI-XFI transceiver 304 to an appropriate rate for the G.709 framer with FEC 404 to operate on the signal to perform framing, OAM&P, and FEC. The input and output to the CDR 306 is a 10 Gbps XFI signal. The multiplexer/de-multiplexer 406 is configured to adapt the input and output from the G.709 framer with FEC 404 back to the XFI rate for input and output to the CDR 306. Optionally, the multiplexer/de-multiplexer 406 can be integrated with the FEC 404 and the CDR 306 in a single chip. Also, the multiplexer/de-multiplexer 406 are not necessary and can be optional in the design (i.e. the FEC 404 can stand alone without the multiplexer/de-multiplexer 406).

In the exemplary embodiments of FIGS. 6a-6b, the G.709 framer with FEC 404 is configured to accept an unframed signal such as a 10 GbE or 10 G FC signal from the XAUI-XFI transceiver 304 and to pass a G.709 framed signal to the CDR 306. The G.709 framer with FEC 404 includes integrated circuitry to add a G.709 frame to the unframed signal including G.709 OAM&P and FEC and to pass the framed signal to the CDR 306. Further, the G.709 framer with FEC 404 includes integrated circuitry to remove a G.709 frame including processing the G.709 OAM&P and FEC and to pass the unframed signal to the XAUI-XFI transceiver 304. The G.709 frame includes overhead bytes for OAM&P and FEC data.

The G.709 framer with FEC 404 is configured to pass overhead to the host 302 either through the MDIO 316 or through a direct connection. Using the MDIO 316, the pluggable transceiver 400 utilizes unused MDIO 316 registers to communicate overhead data in a manner fully supported by the MSA specifications. For example, the XENPAK, XPAK, and X2 MSAs include unused registers which can be used to implement advanced features such as passing management overhead externally from the pluggable transceiver 400. These registers can be used both for passing G.709 OAM&P and FEC information when the overhead is terminated on the transceiver 400. In the case of terminating the overhead on the transceiver 400, a subset of G.709 overhead is terminated due to limitations in the MDIO 316 access. The present invention can provide all or a subset of G.709 OAM&P to comply with the communication requirements in the MSAs. Additionally, the G.709 framer with FEC 404 can be configured to pass the entire G.709 overhead to the host 302 through a direct connection.

The G.709 framer with FEC 404 is an integrated circuit such as a custom built application specific integrated circuit (ASIC). The design of G.709 framer with FEC 404 is such to minimize power dissipation and each device is designed for less than 1.5 W of power consumption to ensure the pluggable transceiver 400 meets or exceeds the XPAK, XENPAK, and X2 MSA specifications.

Additionally, the G.709 framer with FEC 404 is configured to add/remove and process FEC overhead on an optical signal. The addition of FEC in the pluggable transceiver 400 provides an additional 6 to 9 dB of coding gain that can provide improved link budgets, higher system margins for robust connections, relaxed specifications on the optical components, real time monitoring of the link health status and historical BER data, and real-time monitoring of link degradation without affecting the quality of the link. In one exemplary embodiment, the FEC is Reed-Solomon (255, 239) code as defined in G.709 and is capable of correcting eight symbol errors per block. Additionally, the present invention can be modified by one skilled in the art to enable other framing and FEC techniques on pluggable transceivers 400.

In FIG. 6b, the pluggable transceiver 450 includes the same functionality as the pluggable transceiver 300 in FIG. 5a with a XAUI-XFI transceiver including an integrated G.709 framer with FEC 460, a CDR 306 module, an optical module 310, MDIO 316, and DOM 318. The pluggable transceiver 450 includes G.709 framing, OAM&P, and FEC within the XAUI-XFI transceiver 460. The XAUI-XFI transceiver 460 includes the same functionality as the components 304,402, 404,406 in FIG. 6a in a single module. For example, the XAUI-XFI transceiver 460 can include a single ASIC combining the XAUI-XFI transceiver functionality with multiplexer/de-multiplexer, G.709 framing, OAM&P, and FEC functionality. Additionally, the XAUI-XFI transceiver 460 can include the CDR 406 functionality, removing the need for a separate module.

Optionally, the pluggable transceivers 400,450 can include an electronic dispersion compensating (EDC) 408 circuit configured to electronically compensate for the optical fiber chromatic and/or polarization mode dispersion on the TX 312 and RX 314. The EDC 408 circuit removes the requirement to include dispersion compensating elements such as dispersion compensating fiber (DCF) in-line with the pluggable transceivers 400,450. Such DCF modules increase system cost and reduce system performance. Additionally, the EDC 408 can include the functionality of the CDR 306, removing the need to have a separate CDR 306 circuit.

Figure 7:
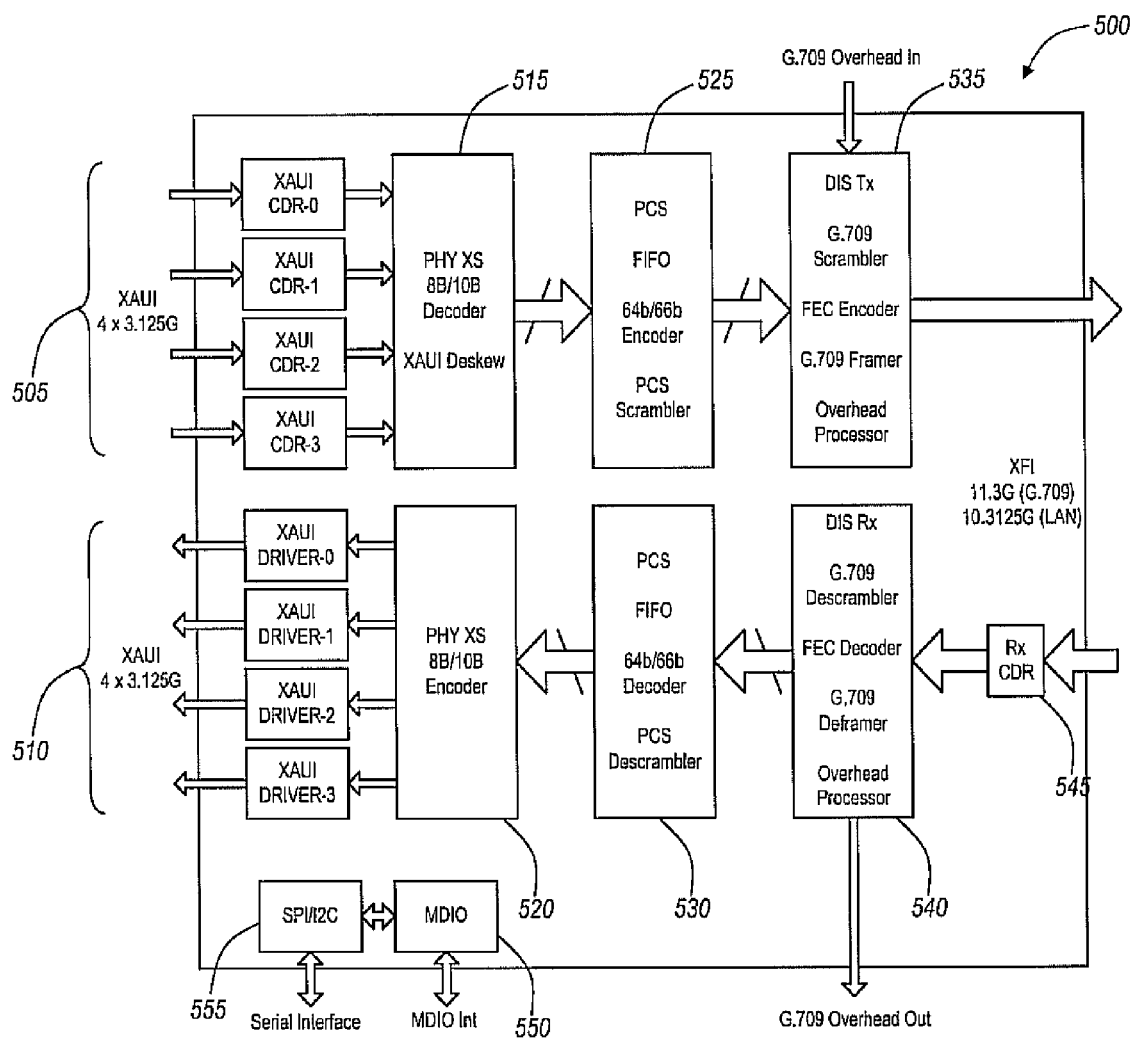
FIG. 7 is a block diagram of an exemplary embodiment of a XAUI-XFI transceiver including integrated G.709 framing and FEC includes integrated circuitry to multiplex/de-multiplex, encode/decode, frame/un-frame, and process overhead and FEC.

Referring to FIG. 7, an exemplary embodiment of a XAUI-XFI transceiver 500 including integrated G.709 framing and FEC includes integrated circuitry to multiplex/de-multiplex, encode/decode, frame/un-frame, and process overhead and FEC. XAUI clock and data recover (CDR) 505 inputs are configured to accept four 3.125 Gbps signals from a host system, to retime, recover the clock, and pass the four 3.125 Gbps signals to a PHY XS 8B/10B decoder 515. The decoder 515 is configured to de-multiplex four XAUI signals running at 3.125 Gbps using 8B/10B encoding and pass the output to a physical coding sub-layer (PCS) 525 module. The PCS 525 module performs 64B/66B encoding to provide a single lane XFI signal running at 10.3125 Gbps and PCS scrambling. The PCS 525 module outputs to a G.709 framer 535. The G.709 framer 535 accepts an output from the PCS 525 module and de-multiplexes it to an appropriate rate for the G.709 framer 535 to operate on the signal.

The G.709 framer 535 is configured to provide G.709 framing, G.709 scrambling, FEC encoding, and G.709 overhead processing. The G.709 framer 535 is configured to communicate with the MDIO 550 utilizing unused registers to communicate overhead to the host system or to communicate through a direct connection to receive G.709 overhead from the host system. Further, the G.709 framer 535 multiplexes the framed signal to input the signal to an optical transmitter off the transceiver 500.

A receiver (RX) clock and data recovery circuit 545 is configured to accept an input from an optical receiver external to the transceiver 500 and to retime, recover the clock, and pass the inputted signal to a G.709 de-framer 540. The G.709 de-framer 540 de-multiplexes the signal to an appropriate rate for the G.709 de-framer 540 to operate on the signal. The G.709 de-framer 540 is configured to provide G.709 de-framing, G.709 de-scrambling, FEC decoding, and G.709 overhead processing. The G.709 de-framer 540 is configured to communicate with the MDIO 550 utilizing unused registers to communicate overhead to the host system or to communicate through a direct connection to pass G.709 overhead to the host system. Further, the G.709 de-framer 540 provides an unframed signal to a PCS 530 module.

The PCS 530 module performs 64B/66B decoding and PCS de-scrambling. The PCS 530 module outputs to a PHY XS 8B/10B encoder 520. The encode 520 is configured to de-multiplex an XFI signal into four XAUI signals running at 3.125 Gbps using 8B/10B encoding and pass the output to four XAUI drivers 510. The XAUI drivers 510 provide four 3.125 Gbps signals to the host system. Additionally, the XAUI-XFI transceiver 500 includes a serial packet interface (SPI) and I2C interface 555 for communications to the host system. The MDIO 550 interface is utilized to provide standard MSA-compliant communications to the host system. Additionally, the present invention utilizes the MDIO 550 to communicate a subset of OAM&P and FEC overhead to the host system from the G.709 framer 535 and G.709 de-framer 540 through unused MDIO registers.

Figure 8:
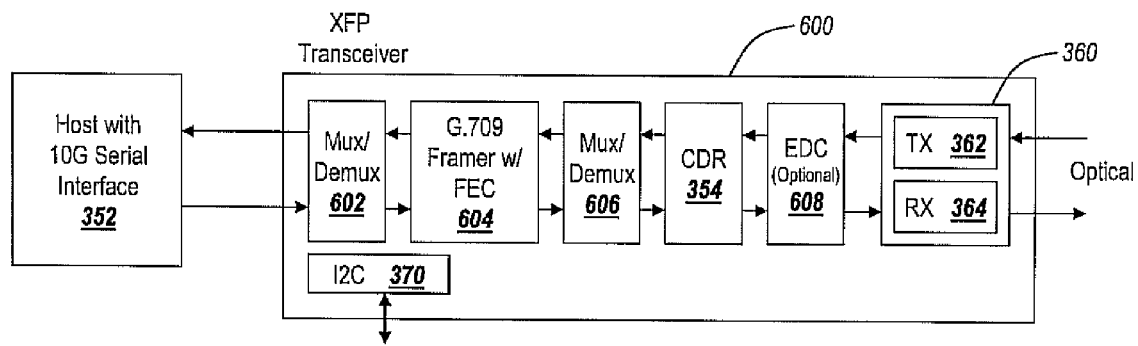
FIG. 8 is a block diagram of a pluggable transceiver for the XFP, XFP-E, and SFP+ MSAs including a G.709 framer with FEC integrated within the pluggable transceiver.

Referring to FIG. 8, in another exemplary embodiment of the present invention, a pluggable transceiver 600 for the XFP, XFP-E, and SFP+ MSAs includes a G.709 framer with FEC 604 integrated within the transceiver 600. The pluggable transceiver 600 includes the same functionality as the pluggable transceiver 350 in FIG. 5b with a CDR 354 module, an optical module 360, and an I2C 670. Additionally, the pluggable transceiver 600 includes a G.709 framer with FEC 604 which is configured to frame an input signal to the transceiver 600 with a G.709 compliant frame. Further, the G.709 framer 604 is configured to provide optical layer OAM&P on the G.709 frame and to provide FEC through the G.709 frame.

The pluggable transceiver 600 includes two multiplexers/de-multiplexers 602,606 connected to the G.709 framer with FEC 604. The input and output from the CDR 354 is a 10 Gbps serial signal. The multiplexer/de-multiplexer 602 is configured to adapt the input and output from a host with a 10 Gbps serial interface 352 to an appropriate rate for the G.709 framer with FEC 604 to operate on the signal to perform framing, OAM&P, and FEC. The input and output to the CDR 354 is a 10 Gbps serial signal. The multiplexer/de-multiplexer 606 is configured to adapt the input and output from the G.709 framer with FEC 604 back to the 10 Gbps rate for input and output from the CDR 354.

In the exemplary embodiment of FIG. 8, the G.709 framer with FEC 604 is configured to accept an unframed signal such as a 10 GbE or 10 G FC signal or a framed signal such as an OC-192 or STM-64 from the host 352 and to pass a G.709 framed signal to the CDR 354. The G.709 framer with FEC 604 includes integrated circuitry to add a G.709 frame to the unframed signal including G.709 OAM&P and FEC and to pass the framed signal to the CDR 406. Further, the G.709 framer with FEC 604 includes integrated circuitry to remove a G.709 frame including processing the G.709 OAM&P and FEC and to pass the unframed signal to the host 352. The G.709 frame includes overhead bytes for OAM&P and FEC data.

The G.709 framer with FEC 604 is configured to pass overhead to the host 352 either through the I2C 370 or through a direct connection. Using the I2C 37-, the pluggable transceiver 600 communicates overhead data in a manner fully supported by the MSA specifications. In the case of terminating the overhead on the transceiver 600, a subset of G.709 overhead is terminated due to limitations in the I2C 370 access. The present invention provides a subset of G.709 OAM&P to comply with the communication requirements in the MSAs. Additionally, the G.709 framer with FEC 604 can be configured to pass the entire G.709 overhead to the host 352 through a direct connection.

The G.709 framer with FEC 604 is an integrated circuit such as a custom built application specific integrated circuit (ASIC). The design of G.709 framer with FEC 604 is such to minimize power dissipation and to keep the power as small as possible to fit within thermal requirements of the host system. Further, the functionality of the multiplexer/de-multiplexer 602,606 and the CDR 354 can be integrated within the G.709 framer with FEC 604 in a single ASIC.

Additionally, the G.709 framer with FEC 604 is configured to add/remove and process FEC overhead on an optical signal. The addition of FEC in the pluggable transceiver 600 provides an additional 6 to 9 dB of coding gain that can provide improved link budgets, higher system margins for robust connections, relaxed specifications on the optical components, real time monitoring of the link health status and historical BER data, and real-time monitoring of link degradation without affecting the quality of the link. In one exemplary embodiment, the FEC is Reed-Solomon (255, 239) code as defined in G.709 and is capable of correcting eight symbol errors per block. Additionally, the present invention can be modified by one skilled in the art to enable other framing and FEC techniques on pluggable transceivers 600.

Optionally, the pluggable transceiver 600 can include an electronic dispersion compensating (EDC) 608 circuit configured to electronically compensate for the optical fiber chromatic and/or polarization mode dispersion on the TX 362 and RX 364. The EDC 608 circuit removes the requirement to include dispersion compensating elements such as dispersion compensating fiber (DCF) in-line with the pluggable transceiver 600. Such DCF modules increase system cost and reduce system performance. Additionally, the EDC 608 can include the functionality of the CDR 354, removing the need to have a separate CDR 354 circuit.

The G.709 framer with FEC 404,604 and XAUI-XFI transceiver including integrated G.709 framer with FEC 460 in FIGS. 6a, 6b, and 8 can be added to any pluggable transceiver. These include currently defined MSAs such as XENPAK, X2, XPAK, XFP, XFP-E, and SFP+ as well as new and emerging specifications which do not incorporate framing integrated with the pluggable transceiver.

Figure 9:
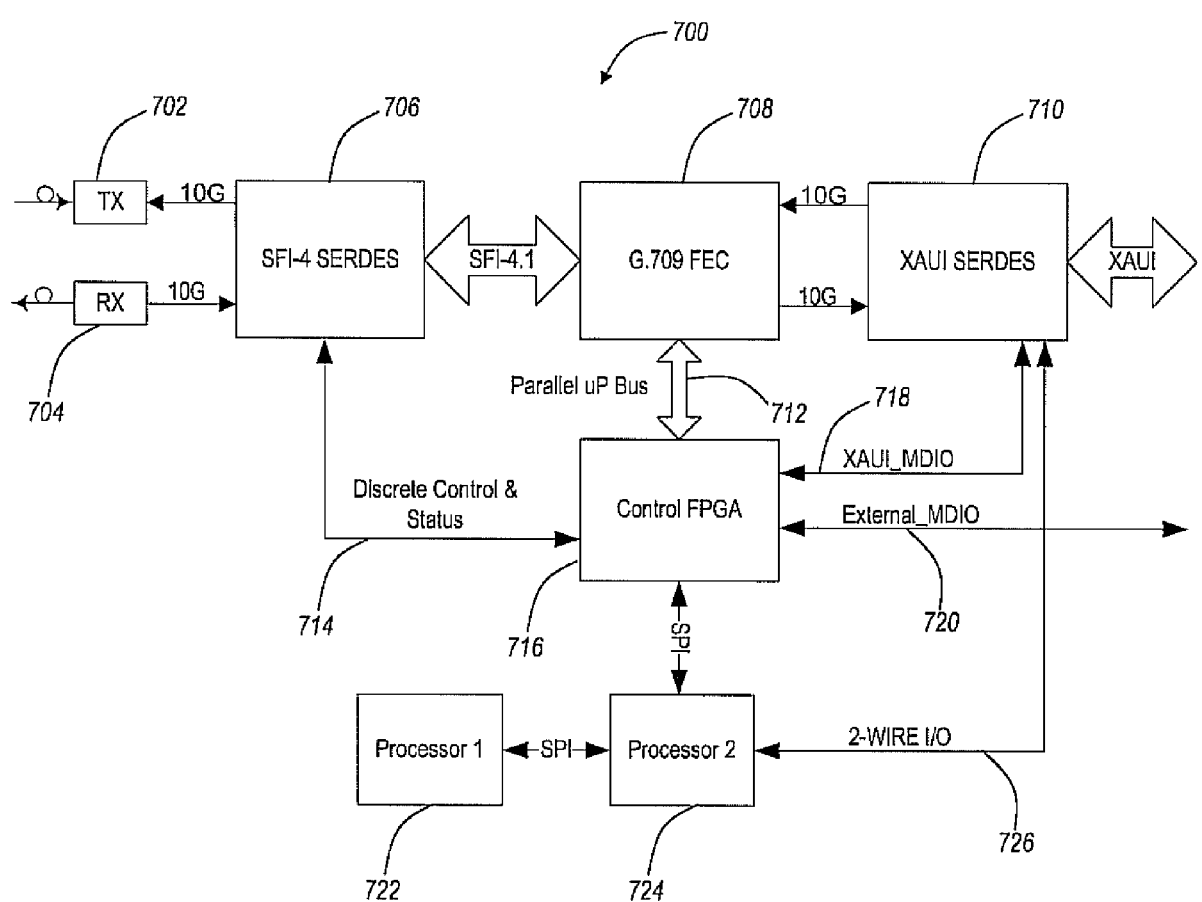
FIG. 9 is a signal flow diagram of a pluggable transceiver with an MDIO bridge to provide a mechanism in the present invention to communicate to the MDIO from a G.709 framer with FEC and from a XAUI serializer/de-serializer (SerDes)

Referring to FIG. 9, an exemplary embodiment of a pluggable transceiver 700 with an MDIO bridge provides a mechanism in the present invention to communicate to the MDIO from a G.709 framer with FEC 708 and from a XAUI serializer/de-serializer (SerDes) 710. The MDIO bridge preserves the standard MDIO functionality found in MSA specifications such as XENPAK, XPAK, and X2 and allows the G.709 framer with FEC 708 to communicate utilizing the same MDIO. As such, a host system configured to communicate with a pluggable transceiver can operate with a pluggable transceiver 700 with an integrated G.709 framer. The host system can be modified in software only to receive MDIO communications from the MDIO bridge.

The pluggable transceiver 700 includes a transmitter (TX) 702 and a receiver (RX) 704 connected at 10 Gbps to an SFI-4 SerDes 706. SFI-4 is SerDes Framer Interface standard level 4 from the Optical Internetworking Forum (OIF). SIF-4 is one example of an interface to the G.709 framer 708. Other interfaces to the G.709 frame can include XGMII, XFI, and XAUI. The SFI-4 SerDes 706 connects to the G.709 framer 708 with an SFI 4.1 signal. The G.709 framer 708 connects at 10 Gbps to the XAUI SerDes 710 which in turn connects to a host device.

The MDIO bridge includes a control field programmable gate array (FPGA) 716 which is configured to bridge the MDIO interface between the G.709 framer 708 and the XAUI SerDes 710. The FPGA 716 connects to the G.709 framer 708 and to the XAUI SerDes 710 and provides a single external MDIO 720 interface to the host device. This external MDIO interface 720 includes data from both the XAUI SerDes 710 and the G.709 framer 708. The FPGA 716 connects to the XAUI SerDes 710 through a XAUI MDIO 718 connection and to the G.709 framer 708 through a parallel microprocessor bus 712. Additionally, the FPGA 716 provides discrete control and status 714 to the SFI-4 SerDes 706. The FPGA 716 has a serial packet interface (SPI) to a processor 724 which in turn has a 2-wire input/output (I/O) connection 726 to the XAUI SerDes 710 and a SPI interface to another processor 722.

The FPGA 716 is configured to decode MDIO addresses and pass MDIO data between both the G.709 framer 708 and the XAUI SerDes 710. Also, the FPGA 716 is configured to combine MDIO data from both the G.709 framer 708 and the XAUI SerDes 710 to the external MDIO 720. As such, the MDIO bridge provides a mechanism for a single, MSA-compliant MDIO interface to operate with the additional circuitry of the G.709 framer with FEC 708.

Figure 10:
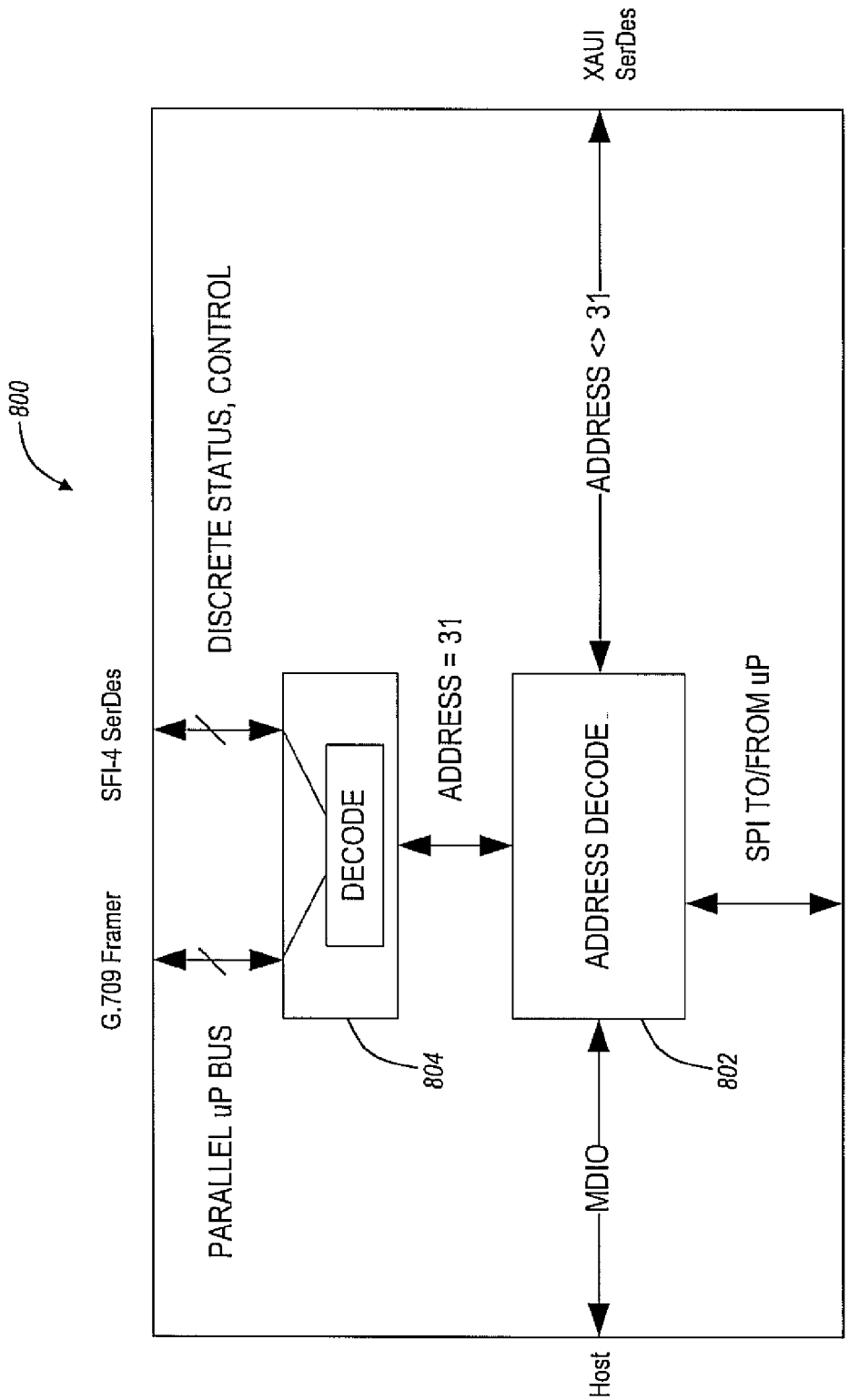
FIG. 10 is a signal flow diagram of an MDIO bridge to perform an address decode to split MDIO data between a G.709 framer and a XAUI SerDes.

Referring to FIG. 10, the MDIO bridge performs an address decode 802 to split MDIO data between the G.709 framer and the XAUI SerDes. The address decode 802 receives/transmits MDIO data to/from the host device and checks the MDIO address. If the MDIO is a specific address, then the address decode sends it to decode 804. If not, then the address decode 802 sends it to the XAUI SerDes. For example, if the MDIO address is 31, then the address is sent to decode 804. If the address is not 31, then it sends the data to the XAUI SerDes. The address corresponds to the register in the MDIO, and register 31 can be undefined in some of the MSA specifications allowing register 31 to be used to pass overhead between the G.709 framer and the host system. Any other register in the MDIO which is undefined can be used to pass overhead. The decode 804 determines whether the data with address 31 should go to the parallel microprocessor bus to the G.709 framer or to the SFI-4 SerDes for discrete status and control. Additionally, the present invention can perform processing of overhead onboard the pluggable transceiver, such as in the FEC chip and the like. The overhead is analyzed to provide the overhead in a readable format to a user. The MDIO can be utilized to pass analyzed overhead to a host system.

Figure 11:
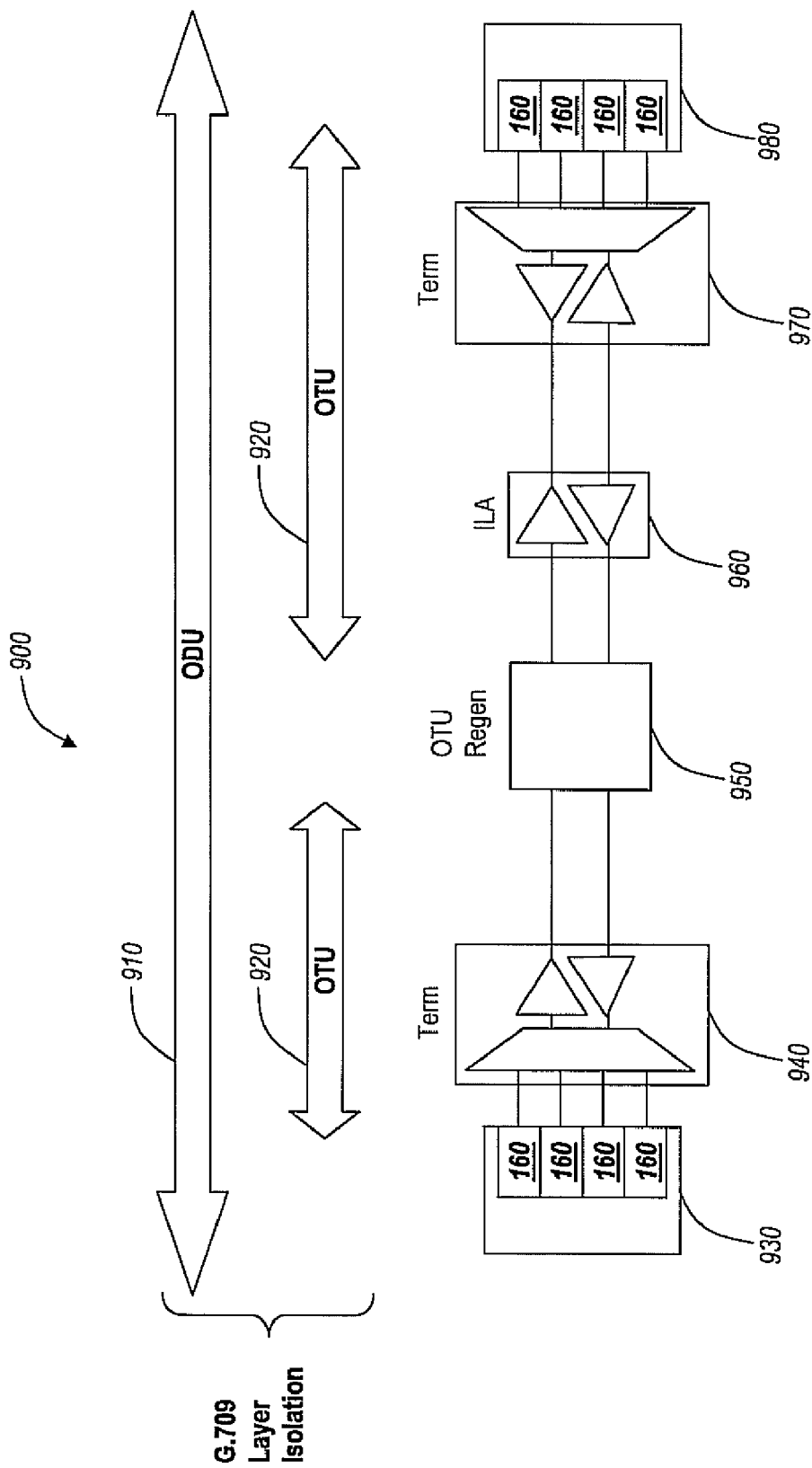
FIG. 11 is a network diagram of a layered approach to management and monitoring of sections in an optical network from ITU-T Recommendation G.709.

Referring to FIG. 11, ITU-T Recommendation G.798 defines a layered approach to management and monitoring of sections in an optical network 900. G.798 provides for transparency in wavelength services, improvement in optical link performance through out-of-band forward error correction (FEC), improved management through full transparency, and interoperability with other G.709 clients. G.709 defines a wrapper in which a client signal is encapsulated. The G.709 wrapper includes overhead bytes for optical layer OAM&P and FEC overhead for error correction. G.709 provides the framing, alarms and PM error information. G.826 and G.8201 explain how to display the PMs. G.975 and G.975.1 specify the FEC algorithms.

The optical network 900 includes client devices 930,980 each equipped with one or more pluggable transceivers 160 of the present invention. The pluggable transceivers 160 of the client device 930 are connected to an optical terminal 940, an optical transport unit (OTU) regen 950, an in-line line amplifier (ILA) 960, and a second optical terminal 970 which is connected to the pluggable transceivers 160 of the second client device 980. The optical channel data unit (ODU) 910 layer is between optical client elements. In the example of FIG. 11, the ODU 910 layer is between each pluggable transceiver 160 of the first client device 930 and each pluggable transceiver 160 of the second client device 980. The ODU 910 layer is similar to the line layer in the SONET standard. The optical transport unit (OTU) 920 is between the OTU regen 950 and each of the pluggable transceivers 160 of the client devices 930,980 similar to the SONET section layer.

In an exemplary embodiment of the present invention, G.709 framing is integrated into pluggable transceivers specified by MSAs such as XFP, XPAK, XENPAK, X2, XFP-E, SFP, and SFP+. The G.709 framing in the pluggable transceivers provides the ability to monitor OAM&P associated with the G.709 ODU 910 and OTU 920 layers to enable optical layer OAM&P functions necessary for metro, regional and core applications direct from pluggable transceivers. The monitoring of the ODU 910 and OTU 920 layers allows isolation of OAM&P and error monitoring between optical sections of the pluggable transceivers. Further, the pluggable transceivers are capable of being monitored by industry-compliant network management systems (NMS) through the I2C or MDIO. The pluggable transceivers of the present invention can support any framing method capable of OAM&P at the optical layer in addition to G.709.

Figure 12A:
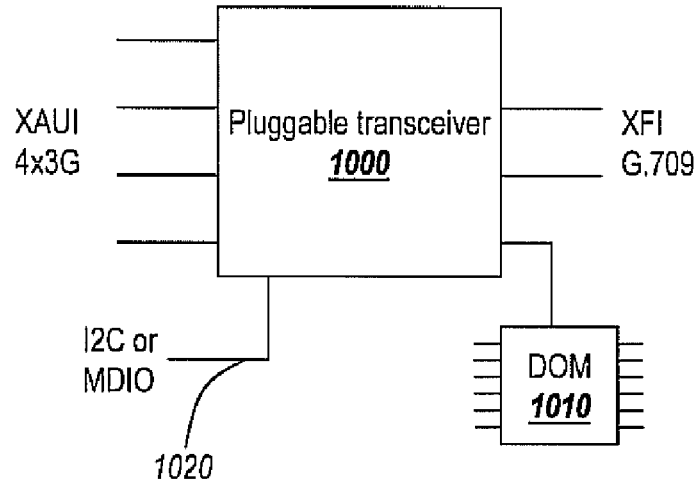
FIGS. 12*a*-12*b* are block diagrams illustrating frame overhead management data terminated internally in a pluggable transceiver or passed to a host system.
Figure 12B:
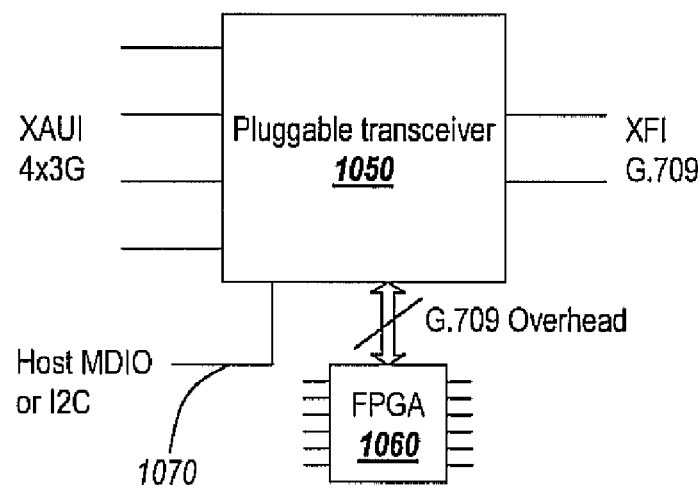

Referring to FIGS. 12*a*-12*b*, the present invention terminates frame overhead management data internally in a pluggable transceiver or passes the frame overhead management data to a host system. In FIG. 12*a*, the MDIO or I2C 1020 is configured for on-chip OAM&P access in a pluggable transceiver 1000. The pluggable transceiver 1000 includes circuitry to frame an incoming signal, to add FEC to the signal, and to manage the optical output signal through OAM&P mechanisms. For example, the pluggable transceiver 1000 can include a XENPAK, XPAK, or X2 MSA type transceiver configured to accept XAUI inputs and provide an XFI output with the framing circuitry configured to provide a G.709 optical signal with the XFI signal encapsulated.

The pluggable transceiver 1000 includes circuitry configured to manage OAM&P through the frame overhead. In an example embodiment, the framing technique is G.709 and the pluggable transceiver 1000 is configured to terminate selected overhead bytes from the G.709 overhead to provide for optical layer OAM&P. The data terminated from these bytes can be provided to the host system (i.e. line card, blade) through vendor-specific (i.e., unused or unspecified) MDIO registers in the MSA specification. For example, XENPAK, XPAK, and X2 include MDIO registers reserved for future use. OAM&P access can be implemented on these registers while maintaining compliance with the MSA specification. Pluggable transceiver 1000 provides access to a subset of G.709 management overhead similar to WAN PHY in that it does not terminate all OAM&P on G.709 due to power, space, and host communication constraints, but it does allow for carrier grade OAM&P on the transceiver 1000 without the extra features not current defined or commonly used. From a hardware perspective, the host system is designed to read the MDIO according to the MSA specification. The host system can be modified through software only to read and process the OAM&P data received on the MDIO registers.

With regards to XFP, XFP-E, SFP, and SFP+, the OAM&P data access is done through the inter-integrated circuit (I2C) serial bus. I2C is a serial communications bus through which a pluggable transceiver, such as XFP, XFP-E, and SFP+, communicates to the host system. DOM 1010 is a monitoring scheme for physical layer parameters utilized by each MSA specification for performance monitoring on the pluggable transceiver. For example, the DOM 1010 can provide PMs such as optical output power, optical input power, laser bias current, etc.

In FIG. 12*b*, the frame overhead is configured to pass the frame overhead off-chip in a pluggable transceiver 1050 to a field programmable gate assembly (FPGA) 1060 for terminating the entire frame overhead. The pluggable transceiver 1050 includes circuitry to frame an incoming signal, to add FEC to the signal, and to manage the optical output signal through OAM&P mechanisms. For example, the pluggable transceiver 1050 can include a XENPAK, XPAK, or X2 MSA type transceiver configured to accept XAUI inputs and provide an XFI output with the framing circuitry configured to provide a G.709 optical signal with the XFI signal encapsulated. The pluggable transceiver 1050 includes circuitry configured to manage OAM&P through the frame overhead. In an example embodiment, the framing technique is G.709 and the pluggable transceiver 1050 is configured to terminate selected overhead bytes from the G.709 overhead to provide for optical layer OAM&P. The data terminated from these bytes can be provided to the host system (i.e. line card, blade) through the FPGA 1060. The host system can be modified to receive and process all of the OAM&P from the FPGA 1060. Additionally, FIGS. 12*a*-12*b* can include an XFI 10 G serial input to both the pluggable transceiver 1000, 1050 instead of a XAUI interface.

Figure 13:
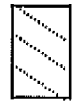
FIG. 13 is a diagram of G.709 overhead.

Referring to FIG. 13, the G.709 overhead 1100 is partitioned into OTU frame alignment bytes in row 1, columns 1-7; ODU overhead bytes in rows 2-4, columns 1-14; OTU overhead bytes in row 1, columns 8-14; and OPU overhead in rows 1-4, columns 15-16. Further, the G.709 overhead 1100 includes FEC data (not shown) in the frame. As discussed in FIGS. 12*a*-12*b*, the present invention discloses two methods of terminating frame management overhead by either terminating a subset of the overhead in the pluggable transceiver or by passing the entire overhead off-chip to the host system. In an exemplary embodiment of the present invention, FIG. 13 depicts an example of the subset of G.709 overhead that is terminated on-chip in the pluggable transceiver.

The subset of G.709 overhead terminated on chip includes the frame alignment signal (FAS) bytes and the multi-frame alignment signal (MFAS) which are the OTU frame alignment bytes. Also, the subset of G.709 overhead includes the section monitoring (SM) bytes and the path monitoring (PM) bytes to provide optical layer error management between optical section and path in G.709. The SM bytes include dedicated BIP-8 monitoring to cover the payload signal, and these are accessible at each pluggable transceiver. The first byte of the SM used for Trail Trace Identifier (TTI) which is a 64-byte character string similar to a section trace in SONET. The SM/PM bytes include dedicated BIP-8 monitoring to cover the payload signal, and these are accessible at each pluggable transceiver. The first byte of the SM/PM is used for TTI which is similar to path trace in SONET. The general communication channel 0 (GCC0) bytes provide a communications channel between adjacent G.709 nodes.

Additionally, the subset of G.709 overhead terminated on chip includes the payload signal identifier (PSI), justification control (JC), and negative justification opportunity (NJO). For asynchronous clients such as 10 GbE and 10 G FC, NJO and PJO are used as stuff bytes similar to PDH. If the client rate is lower than OPU rate, then extra stuffing bytes may be inserted to fill out the OPU. Similarly, if the incoming signal to the pluggable transceiver is slightly higher than the OPU rate, NJO and PJO bytes may be replaced with signal information, i.e. the OPU payload capacity is increased slightly to accommodate the extra traffic on the pluggable transceiver, and the JC bytes reflect whether NJO and PJO are data or stuff bytes the JC bytes are used at the off-ramp to correctly de-map the signal. The PSI provides an identification of the payload signal.

Because the current MSA specifications were never envisioned to carry full OAM&P overhead data on and off a pluggable transceiver, the present invention provides a subset of OAM&P access to minimize power, space, cost, and host communications in the circuitry on the pluggable transceiver to fit within the MSA specification and to continue offering the benefits of pluggable transceivers such as low cost. However, this subset of OAM&P still allows network operators to realize carrier-grade optical layer performance monitoring directly off pluggable transceivers without additional hardware. Further, the above exemplary embodiment with G.709 OAM&P can be utilized in any framing technique on a pluggable transceiver. The subset of G.709 overhead terminated in FIG. 13 can be modified depending on the application requirements.

In an exemplary embodiment of the present invention, unused bytes in the G.709 overhead 1100 can be utilized to create a closed loop communications channel between a near end and a far end pluggable transceiver. For example, the EXP (experimental) overhead in the ODU path overhead could be used. The EXP overhead does not impact the payload bit rate or transparency and is transparent to OTU regenerators. The closed loop communications channel can be configured to provide far end PM counts, far end loopback initiation and release, far end PRBS injection, far end alarms, far end general communications, and the like.

The closed loop communications channel can be utilized for accessing the far end pluggable transceiver in the Ethernet demarcation application. Here, the far end pluggable transceiver can be configured to not provide OAM&P to a remote host system since the host system is a CPE device which likely is not configured for accessing OAM&P from the pluggable transceiver. Instead, the far end provides its OAM&P to the near end through the communications channel allowing for Ethernet demarcation at the far end to be monitored and executed locally.

Figure 14A:
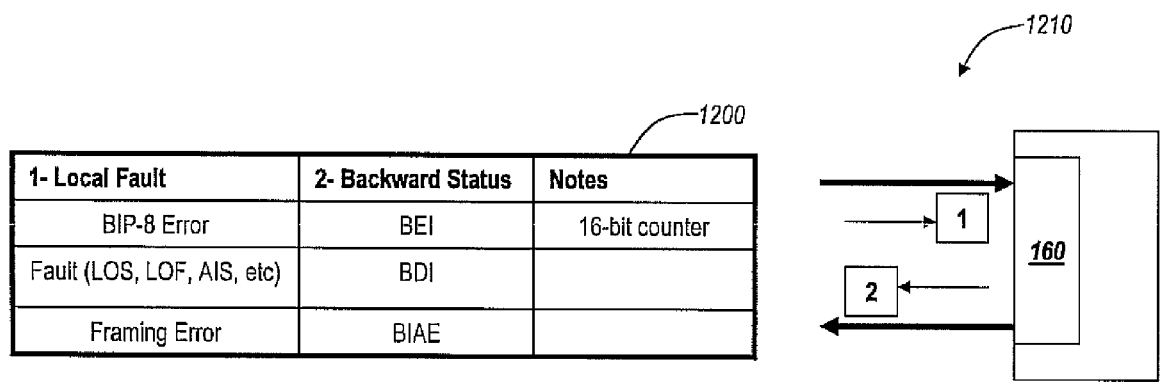
FIGS. 14*a*-14*b* are diagrams illustrating frame error reporting in G.709 and an network discovery and connection management.
Figure 14B:
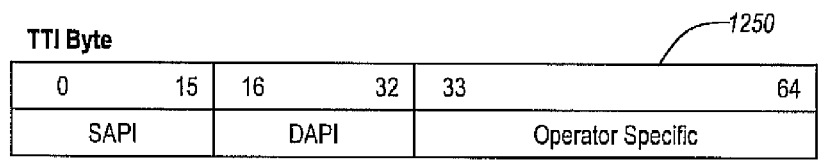

Referring to FIGS. 14a-14b, an exemplary embodiment of frame error reporting in G.709 is depicted in FIG. 14a and an exemplary embodiment of network discovery and connection management is depicted in FIG. 14b. FIG. 14a includes a table 1200 illustrating local faults 1 such as a BIP-8 error, fault (loss-of-signal, loss-of-frame, alarm indication signal, etc.), and framing error along with the corresponding backward status 2. Network element 1210 is equipped with a pluggable transceiver 160 equipped with a TX and RX and configured to provide overhead and framing internal to the transceiver 160. The local fault 1 is seen on the RX side of transceiver 160 and the corresponding backward status 2 is transmitted over the overhead. In an exemplary embodiment, the MDIO reports OTU BIP-8 error counts for the near end (NE) and far end (FE) in a 16-bit register, ODU BIP-8 error counts for the NE and FE in a 16-bit register, and the corrected FEC error count for the NE in a 32-bit register.

FIG. 14b includes a table 1250 illustrating a TTI byte used for connection management and network discovery. The pluggable transceiver of the present invention includes OTU and ODU trail trace identifier (TTI) support through, for example, the 64-byte G.709 standard implementation which includes a 16-byte SAPI/DAPI, and a 32-byte user specific field. Further, the pluggable transceiver supports a TTI mismatch alarm.

In an exemplary embodiment of the present invention providing G.709 framing support in a pluggable transceiver, the pluggable transceiver can be configured to provide support of G.709 standardized alarms for fault isolation at the far or near end including:

| Alarms | Description |
| --- | --- |
| LOS | Loss of Signal |
| LOF | Loss of Frame |
| OOF | Out of Frame |
| OOM | Out of Multi Frame |
| OTU-AIS | Alarm Indication Signal |
| OTU-IAE | Incoming Alignment Error |
| OTU-BDI | Backward Defect Indicator |
| ODU-AIS | Alarm Indication Signal |
| ODU-OCI | Open Connection indicator |
| ODU-LCK | Locked |
| ODU-BDI | Backward Error indicator. |
| FAS | Frame Alignment Error |
| MFAS | Multi Frame Alignment Error |
| OTU TTI-M | OTU TTI Mismatch |
| ODU TTI-M | ODU TTI Mismatch |

Further, the MDIO interface provides full control support of the pluggable transceiver including:

| Control | Description |
| --- | --- |
| Loop back | Loop back towards client |
| Loop back | Loop back towards line |
| Low Power | Low Power mode |
| Reset | Reset |
| PRBS31 enable | PRBS payload test pattern |
| Test Pattern Selection | Square Wave or Mixed Frequency |

Further, the pluggable transceiver module status and error registers include the following:

| Status | Description |
| --- | --- |
| Fault | Fault Yes/No |
| Link Status | Link Up or Down |

| PMs Registers | |
| --- | --- |
| OTU BIP NE | OTU BIP Errors - Near End |
| OTU BIP FE | OTU BIP Errors - Far End |
| ODU BIP NE | ODU BIP Errors - Near End |
| ODU BIP FE | ODU BIP Errors - Far End |
| OTU FEC Corrected | OTU FEC Corrected |
| OTU Uncorrected errors | OTU Uncorrected errors |
| BER | Bit Error Rate |

Figure 15:
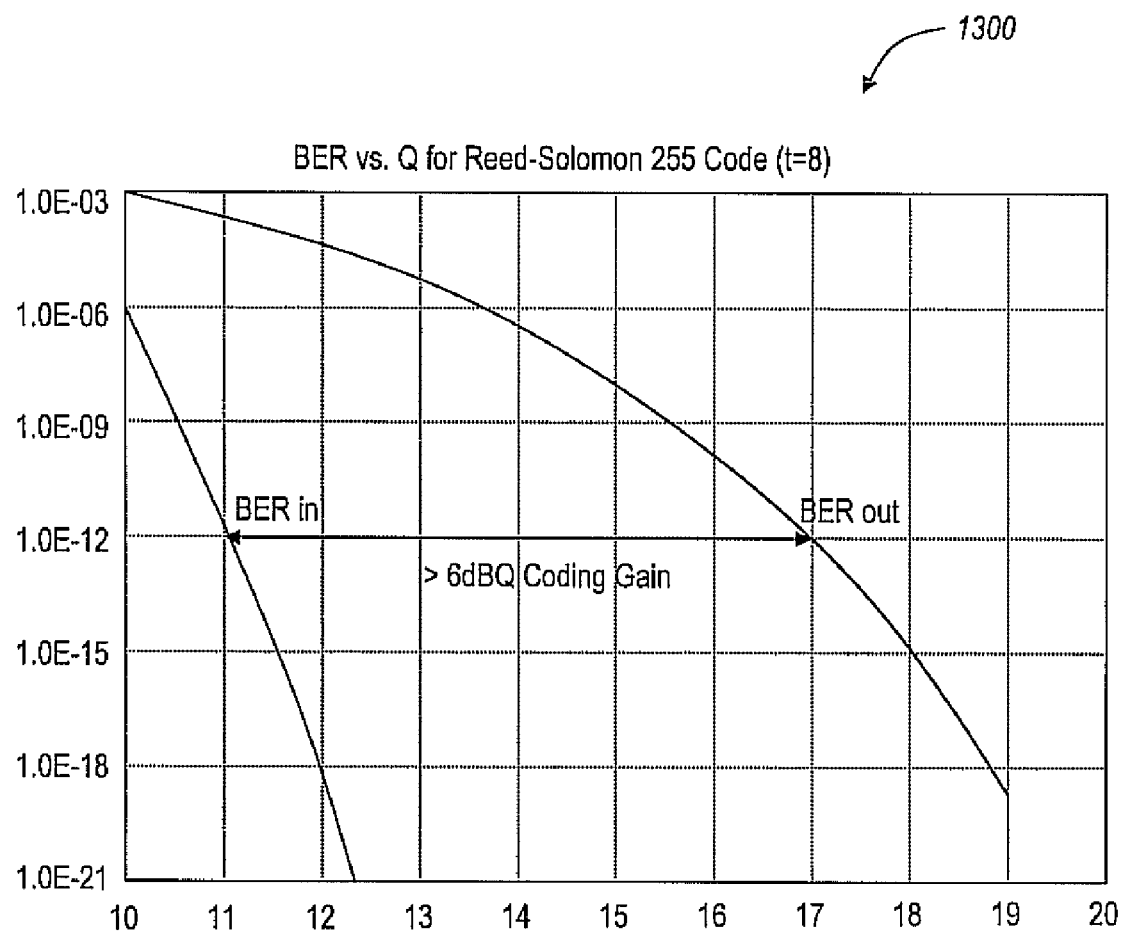
FIG. 15 is a graph of the Reed Solomon FEC code, RS (255, 239)

Referring to FIG. 15, the Reed Solomon FEC code, RS (255, 239), provides 6 dB or more of coding gain to an optical signal. FEC codes operate by encoding additional overhead on a signal at the transmit stage and decoding at the receive stage to utilize the additional overhead to correct errors in the received signal. In optical systems, FEC has been utilized to increase optical margin, to increase transmission distances, lower cost, and relax component specifications in design. The pluggable transceivers of the present invention are configured to implement FEC internally in a pluggable transceiver by encoding FEC overhead on a signal and decoding at the receive stage. In an exemplary embodiment of the present invention, the pluggable transceiver is configured to implement RS (255, 239) as specified by the G.709 standards. The present invention is also applicable to utilize any other FEC algorithm capable of implementation within the confines of power, space, and line-rate associated with the pluggable transceiver MSA specifications. Graph 1300 illustrate bit-error rate (BER) vs. signal quality Q and shows an input BER (BER in) versus the output BER (BER out) after the FEC is processed and errors corrected in the pluggable transceiver. As shown in FIG. 15, a FEC code such as RS (255, 239) provides 6 dB or more coding gain for a BER of 10e-12. This coding gain can be utilized in pluggable transceivers to extend the reach beyond 80 km, to loosen component specifications in the transceiver, and to provide robust carrier-grade performance.

Figure 16:
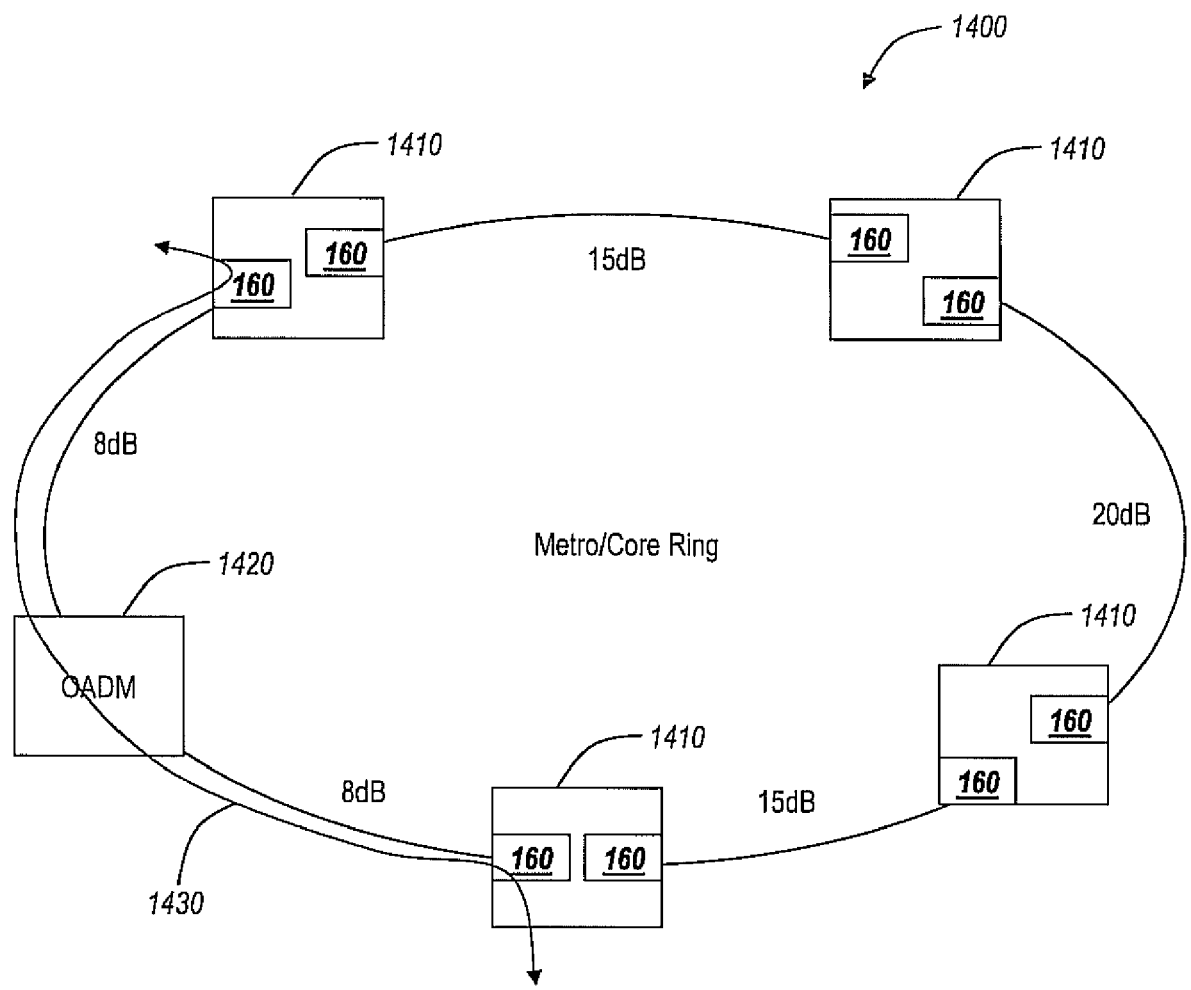
FIG. 16 is a network diagram of an exemplary application of the present invention of a metro/core ring.

Referring to FIG. 16, an exemplary application of the present invention includes a metro/core ring 1400 including optical terminals 1410 and an optical add-drop multiplexer (OADM) 1420. The optical terminals 1410 include network elements with line cards or blades configured with optical pluggable transceivers 160 of the present invention. The pluggable transceivers 160 support framing, optical layer OAM&P, and FEC directly without the need for additional equipment such as transponders. Examples of optical terminals 1410 include routers, Ethernet switches, servers, MSPPs, SONET add-drop multiplexers, DWDM terminals, and cross-connects. The metro/core ring 1400 includes multiple optical terminals 1410 in a ring topology with each optical link including an east and west transceiver 160. Additionally, a single OADM 1420 is including in the metro/core ring 1400 where no transceivers 160 are equipped.

The pluggable transceivers 160 of the present invention support robust, carrier-grade features directly, allowing the application space for pluggable transceivers to move beyond short, interconnect applications. In metro/core ring 1400, the pluggable transceivers 160 of the present invention reduce the amount of amplifiers required, enable more flexible routing options for wavelengths, and provide overall more design flexibility. Existing pluggable transceivers are generally limited to less than 80 km (20 dB or less) and offer no G.709 layer OAM&P. The present invention extends the benefits of pluggable transceivers into metro, regional, and core applications.

Figure 17:
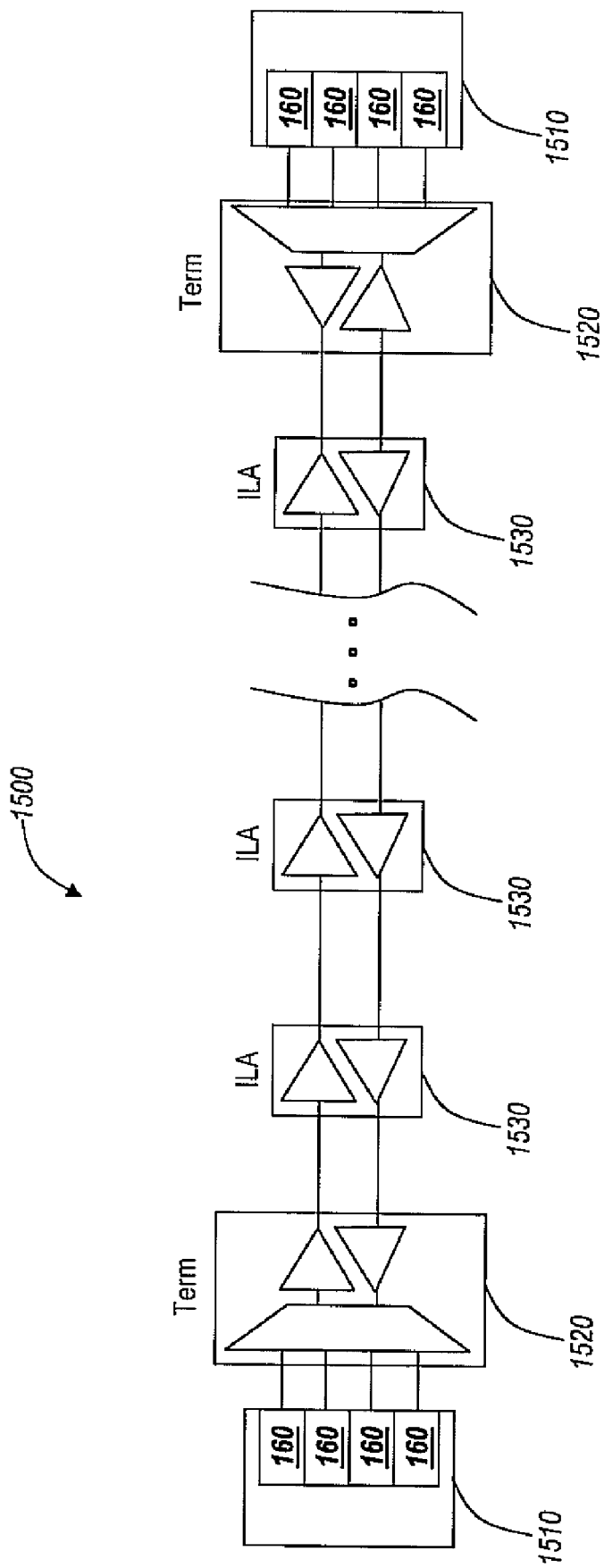
FIG. 17 is network diagram of a regional/core DWDM system according to an exemplary application of the present invention.

Referring to FIG. 17, a regional/core DWDM system 1500 includes a terminal 1510 equipped with multiple pluggable transceivers 160 connected to an optical terminal 1520, multiple inline line amps (ILA) 1530, and another optical terminal 1520 and terminal 1510. The terminals 1510 can include DWDM terminals, MSPPs, SONET ADMs, routers, switches, and cross-connects. Traditionally, terminals 1510 included pluggable transceivers for short, interconnect applications to another device such as a transponder. The pluggable transceiver 160 of the present invention eliminates the need for transponders by supporting framing, optical layer OAM&P, and FEC internally to the transceiver 160. The present invention supports a greater than 2.5 times distance increase over traditional pluggable transceivers. For example, distances up to 1500 km with ILAs 1530 can be achieved with the present invention. Further, the pluggable transceiver 160 supports any optical wavelength type including DWDM wavelengths, eliminating the requirement for transponders to convert to a DWDM wavelength.

The present invention, by incorporating framing such as G.709 and FEC in pluggable transceivers specified by MSAs, significantly enhances performance and OAM&P functions. This allows pluggable transceivers to be used in IP/Ethernet/ATM/Frame Relay/Fiber Channel over WDM, high density/high performance applications, G.709 interconnection applications, and applications requiring comprehensive optical OAM&P. Traditionally, pluggable transceivers have accorded benefits to equipment vendors and network operators such as engineering re-use, streamlined manufacturing and sparing, low cost and multiple manufacturing sources. The present invention builds upon the existing benefits of pluggable transceivers by increasing the application space of pluggable transceivers from short, interconnect applications to metro, regional, and core network applications requiring carrier-grade, robust monitoring and performance.

Figure 18:
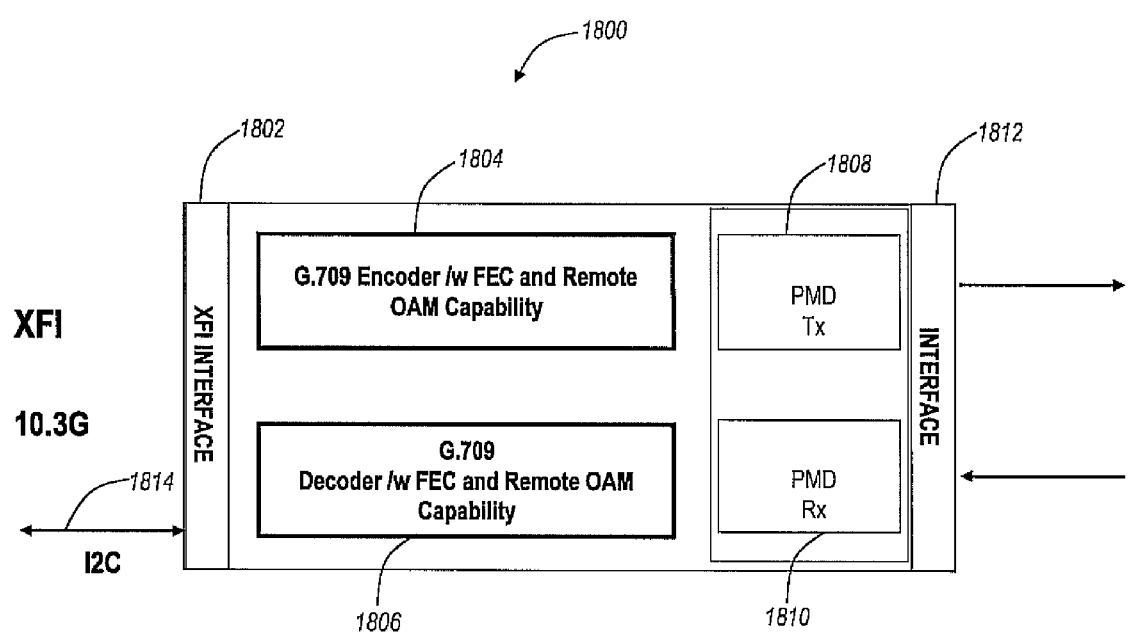
FIG. 18 is a block diagram of an XFP pluggable transceiver for providing Ethernet extension and demarcation according to an exemplary embodiment of the present invention.

Referring to FIG. 18, an XFP pluggable transceiver 1800 is illustrated for providing Ethernet extension and demarcation according to an exemplary embodiment of the present invention. The XFP pluggable transceiver 1800 is configured to plug into any device configured to accept MSA-complaint transceivers, such as CPE routers/switches, etc. The pluggable transceiver 1800 is utilized to provide Ethernet demarcation at a customer device. Here, the customer device is configured to utilize XFP devices based on the MSA specification. The pluggable transceiver 1800 also includes additional circuitry to provide G.709 framing, FEC, and remote OAM&P capabilities. The customer device requires no hardware or software modification. Rather, the G.709 framing, FEC, and remote OAM&P capabilities are completely integrated within the pluggable transceiver 1800 providing a demarcation point from the customer device to a far end port on a service provider's network. Additionally, the far end point has full OAM&P visibility of the pluggable transceiver based on the remote OAM&P capabilities, such as through the closed loop communication channel described in FIG. 13. Also, other MSA-type pluggable transceivers (i.e. XPAK, XENPAK, X2, XFP-E, SFP, and SFP+) can also be utilized for the same Ethernet extension and demarcation functionality.

The XFP pluggable transceiver 1800 includes an XFI interface 1802 configured to interconnect to a host device in a host system. The XFI interface 1802 is configured to transmit/receive a 10.3 Gb/s signal to/from the host system. The XFI interface 1802 connects to both a G.709 encoder 1804 and a G.709 decoder 1806. The G.709 encoder 1804 includes FEC, Remote OAM capability, G.709 framing, SERDES, and CDR functionality as described herein. The G.709 encoder 1804 is configured to receive a signal from the XFI interface 1802, such as an Ethernet client or the like, and provide framing, OAM&P processing, and FEC encoding. The G.709 decoder 1806 includes FEC, remote OAM capability, G.709 de-framing, SERDES, and CDR functionality as described herein. The G.709 decoder 1806 is configured to de-frame a G.709 signal, process OAM&P, and decode FEC and to provide a signal, such as an Ethernet client or the like, to the XFI interface 1802.

The XFP pluggable transceiver 1800 includes a Physical Medium Dependent (PMD) transmitter (Tx) and receiver (Rx) 1808,1810. The PMD Tx 1808 is configured to receive a framed signal from the G.709 encoder 1804 and transmit an optical signal on an interface 1812. For example, the interface 1812 can include an XFI interface, a parallel interface, or the like. The PMD Rx 1810 is configured to receive an optical signal on the interface 1812 and to provide the received optical signal to the G.709 decoder 1806. The PMD Tx/Rx 1808, 1810 can include 850 nm, 1310 nm, 1550 nm, DWDM, CWDM, and the like depending on the application requirements.

The XFP pluggable transceiver 1800 is configured to interface to any host device configured to operate with pluggable transceivers compliant to the XFP MSA. For example, the host device can include a router, switch, optical network element, and the like. The host device can include customer premises equipment (CPE) and service provider equipment. The XFP pluggable transceiver 1800 includes an I2C interface 1814 for communications with the host device. The XFP pluggable transceiver 1800 is configured to utilize the communications detailed in the XFP MSA specification.

When the XFP pluggable transceiver 1800 is configured in a CPE device or other remote device for demarcation, the XFP pluggable transceiver 1800 is configured to only provide standard XFP MSA-based communications over the I2C interface 1814 to the host device. Accordingly, the host device is unaware of the additional framing, FEC, and OAM&P functionality. This enables any XFP-compliant host device to utilize the XFP pluggable transceiver 1800 for demarcation. Here, the OAM&P is provided to a host device at a far end, such as described herein with a closed loop communication channel.

When the XFP pluggable transceiver 1800 is configured in a service provider device or the like, the XFP pluggable transceiver 1800 is configured to provide standard XFP MSA-based communications and G.709 OAM&P information over the I2C interface 1814, such as described in FIGS. 12a-12b. Here, the host device can be configured to utilize the I2C interface 1814 for G.709 OAM&P management of the pluggable transceiver 1800 in the host device and for remote far-end management of another pluggable transceiver 1800 over the closed loop communication channel. The I2C interface 1814 is configured for access to OTN alarms, PMs, and overhead.

Figure 19:
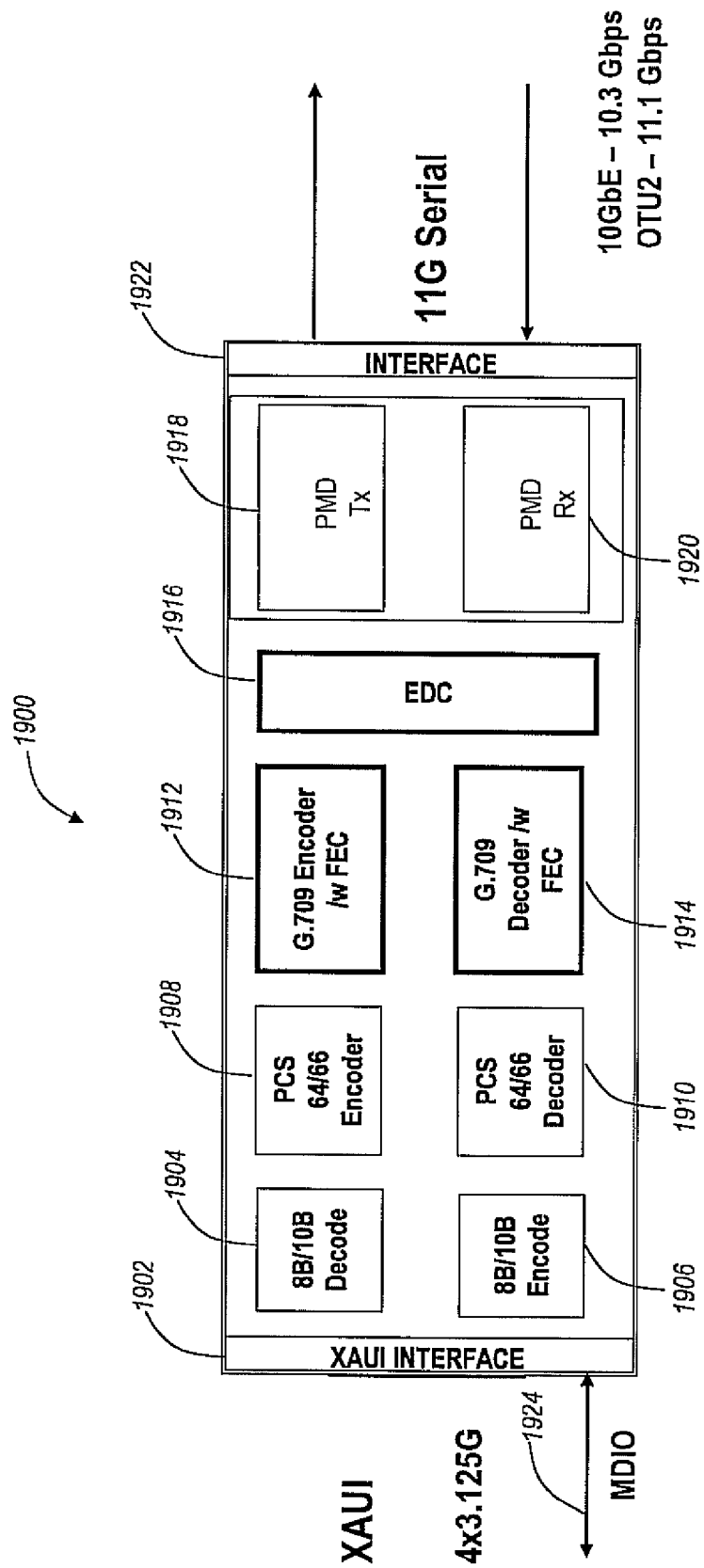
FIG. 19 is a block diagram of a XENPAK pluggable transceiver for providing Ethernet extension and demarcation according to an exemplary embodiment of the present invention.

Referring to FIG. 19, a XENPAK pluggable transceiver 1900 is illustrated for providing Ethernet extension and demarcation according to an exemplary embodiment of the present invention. The XENPAK pluggable transceiver 1900 is configured to plug into any device configured to accept XENPAK-complaint transceivers, such as CPE routers/switches, etc. The XENPAK pluggable transceiver 1900 is utilized to provide Ethernet demarcation at a customer device. Here, the customer device is configured to utilize XENPAK devices based on the MSA specification. The XENPAK pluggable transceiver 1900 also includes additional circuitry to provide G.709 framing, FEC, and remote OAM&P capabilities. The customer device requires no hardware or software modification. Rather, the G.709 framing, FEC, and remote OAM&P capabilities are completely integrated within the XENPAK pluggable transceiver 1900 providing a demarcation point from the customer device to a far end port on a service provider's network. Additionally, the far end point has full OAM&P visibility of the pluggable transceiver based on the remote OAM&P capabilities, such as through the closed loop communication channel described in FIG. 13.

The XENPAK pluggable transceiver 1900 includes a XAUI interface 1902 configured to interconnect to a host device in a host system. The XAUI interface 1902 is configured to transmit/receive a 4×3.125 Gb/s signal to/from the host system. The XAUI interface 1902 connects to both an 8B/10B decoder 1904 and an 8B/10B encoder 1906 which are configured to perform 8B/10B decoding and encoding, respectively, on a signal from/to the XAUI interface 1902. The 8B/10B decoder 1904 connects to a PCS 64/66 encoder 1908 configured to perform 64/66 encoding on the output signal from the 8B/10B decoder 1904. The 8B/10B encoder 1906 receives an input signal from a PCS 64/66 decoder 1910 which is configured to perform 64/66 decoding.

The XENPAK pluggable transceiver 1900 includes a G.709 encoder with FEC 1912 and a G.709 decoder with FEC 1914. The G.709 encoder 1912 includes FEC, Remote OAM capability, G.709 framing, SERDES, and CDR functionality as described herein. The G.709 encoder 1912 is configured to receive a signal from the PCS 64/66 encoder 1908, such as an Ethernet client or the like, and provide framing, OAM&P processing, and FEC encoding. The G.709 decoder 1914 includes FEC, remote OAM capability, G.709 de-framing, SERDES, and CDR functionality as described herein. The G.709 decoder 1914 is configured to de-frame a G.709 signal, process OAM&P, and decode FEC and to provide a signal, such as an Ethernet client or the like, to the PCS 64/66 decoder 1910. Optionally, the XENPAK pluggable transceiver 1900 can include an EDC 1916 configured to perform electronic dispersion compensation.

The XENPAK pluggable transceiver 1900 includes a Physical Medium Dependent (PMD) transmitter (Tx) and receiver (Rx) 1918,1920. The PMD Tx 1918 is configured to receive a framed signal from the G.709 encoder 1912 (or the EDC 1916) and transmit an optical signal on an interface 1922. For example, the interface 1922 can include an XFI interface, a parallel interface, or the like. The PMD Rx 1920 is configured to receive an optical signal on the interface 1922 and to provide the received optical signal to the G.709 decoder 1914 (or the EDC 1916). The PMD Tx/Rx 1918,1920 can include 850 nm, 1310 nm, 1550 nm, DWDM, CWDM, and the like depending on the application requirements. Additionally, the XENPAK pluggable transceiver 1900 can include a WIS encoder/decoder between the PCS 1908,1910 and G.709 1912,1914 blocks.

The XENPAK pluggable transceiver 1900 is configured to interface to any host device configured to operate with pluggable transceivers compliant to the XENPAK MSA. For example, the host device can include a router, switch, optical network element, and the like. The host device can include customer premises equipment (CPE) and service provider equipment. The XENPAK pluggable transceiver 1900 includes an MDIO interface 1924 for communications with the host device. The XENPAK pluggable transceiver 1900 is configured to utilize the communications detailed in the XENPAK MSA specification.

When the XENPAK pluggable transceiver 1900 is configured in a CPE device or other remote device for demarcation, the XENPAK pluggable transceiver 1900 is configured to only provide standard XENPAK MSA-based communications over the MDIO interface 1924 to the host device.

Accordingly, the host device is unaware of the additional framing, FEC, and OAM&P functionality. This enables any XENPAK-compliant host device to utilize the XENPAK pluggable transceiver 1900 for demarcation. Here, the OAM&P is provided to a host device at a far end, such as described herein with a closed loop communication channel.

When the XENPAK pluggable transceiver 1900 is configured in a service provider device or the like, the XENPAK pluggable transceiver 1900 is configured to provide standard XENPAK MSA-based communications and G.709 OAM&P information over the MDIO interface 1924, such as described in FIGS. 12*a*-12*b*. Here, the host device can be configured to utilize the MDIO interface 1924 for G.709 OAM&P management of the XENPAK pluggable transceiver 1900 in the host device and for remote far-end management of another XENPAK pluggable transceiver 1900 over the closed loop communication channel. The MDIO interface 1924 is configured for access to OTN alarms, PMs, and overhead. The present invention also contemplates similar operation with other MSA-compliant pluggable transceivers, such as X2, SFP+, and the like.

With respect to Ethernet demarcation, the XFP pluggable transceiver 1800 and XENPAK pluggable transceiver 1900 provides network operators and customers significant advantages. For example, demarcation through a pluggable device significantly reduces capital costs, footprint, power, and installation/turn-up requirements.

Figure 20:
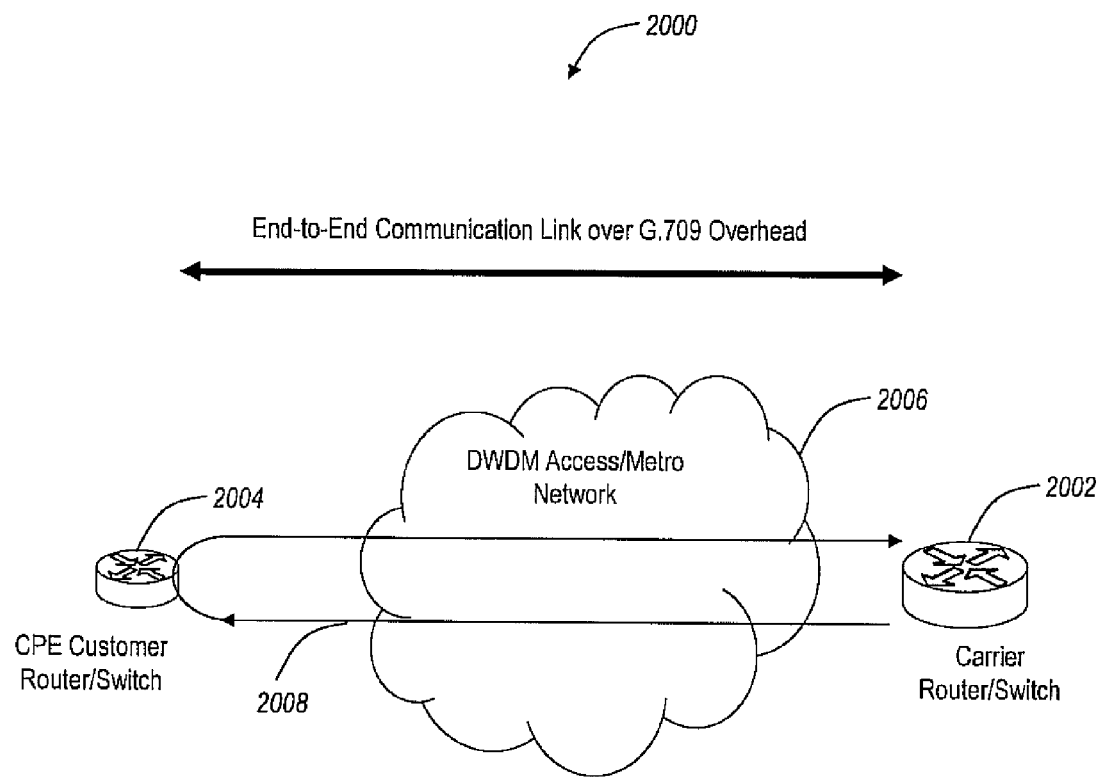
FIG. 20 is a network diagram illustrating an exemplary application of far end demarcation and control according to an exemplary embodiment of the present invention.

Referring to FIG. 20, a network 2000 illustrates an exemplary application of far end demarcation and control according to an exemplary embodiment of the present invention. The network 2000 includes a carrier router/switch 2002 connected to a CPE customer router/switch 2004 through a network 2006. For example, the network 2006 can include a DWDM access/metro network or the like. Both of the routers/switches 2002,2004 are configured with pluggable transceivers configured with framing, OAM&P, and FEC as described herein. The pluggable transceivers enable a carrier to demarcate their connection to a customer physically at the router/switch 2004 through the pluggable transceiver itself. Also, the router/switch 2004 is only required to operate an MSA-compliant pluggable transceiver without any additional hardware or software functionality.

The router/switch 2002 can establish end-to-end communication through G.709 overhead between the pluggable transceivers in both of the routers/switches 2002,2004. For example, a communication channel 2008 can be established between the pluggable transceiver in the router/switch 2002 and the pluggable transceiver in the router/switch 2004. This can be through the GCC, EXP, or other bytes in the G.709 overhead with no impact on standard G.709 overhead usage. For example, it is possible to obtain some remote PMs from the SM/PM. Also, BDI is from the SM/PM bytes. The communication channel 2008 is utilized to provide alarming, PM, provisioning, and the like from the remote end at the router/switch 2004 to the carrier at the router/switch 2002.

Referring to FIG. 21, a table 2100 illustrates exemplary remote demarcation OAM&P functions available through pluggable transceivers according to an exemplary embodiment of the present invention. From a pluggable transceiver at a far end, a remote end pluggable transceiver can be provisioned, troubleshot, and monitored. With respect to provisioning, the remote pluggable transceiver can be commissioned and accepted. Remote provisioning functions can include traffic provisioning, maintenance activities, and traces.

With respect to alarming, the remote pluggable transceiver can be monitored and troubleshot to determine where faults occur, i.e. traditional demarcation functions. Alarming can include G.709 standard backward alarming and remotely fetched alarms. With respect to performance monitoring, the remote pluggable transceiver can be monitored for end-to-end service level agreements (SLAs) as are typical of demarcation devices. This can include monitoring far end PMs and FEC errors.

Figure 22:
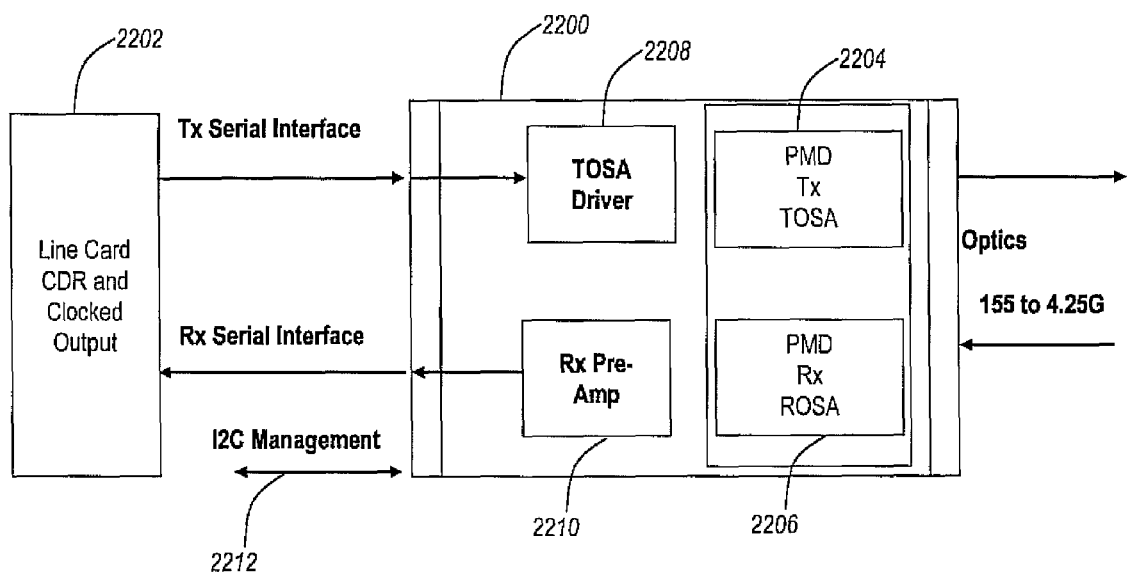
FIG. 22 is a block diagram of a conventional SFP module.

Referring to FIG. 22, a conventional SFP module 2200 is illustrated. The SFP module 2200 is a compact pluggable transceiver used in optical communications for both telecommunication and data communications applications. It interfaces a network device line card 2202 (for a switch, router or similar device) to a fiber optic or unshielded twisted pair networking cable. The SFP module 2200 is a popular industry format supported by several fiber optic component vendors. SFP transceivers 2200 are designed to support SONET, Gigabit Ethernet, Fibre Channel, and other communications standards.

SFP transceivers are available with a variety of different transmitter (Tx) 2204 and receiver (Rx) 2206 types, allowing users to select the appropriate transceiver for each link to provide the required optical reach over the available optical fiber type (e.g. multi-mode fiber or single-mode fiber). Optical SFP modules 2200 are commonly available in four different categories: 850 nm (SX), 1310 nm (LX), 1550 nm (ZX), and DWDM. SFP transceivers 2200 are also available with a "copper" cable interface, allowing a host device designed primarily for optical fiber communications to also communicate over unshielded twisted pair networking cable. There are also CWDM and single-optic (1310/1490 nm upstream/downstream) SFPs. The different categories of SFP modules 2200 are based on different PMD Tx Transmitter Optical Subassemblies (TOSA) 2204 and PMD Rx Receiver Optical Subassemblies (ROSA) 2206.

The SFP transceiver 2200 is specified by a multi-source agreement (MSA) between competing manufacturers. The SFP transceiver 2200 is commercially available with capability for data rates up to 4.25 Gbit/s or higher. The SFP transceiver 2200 supports digital optical monitoring (DOM) functions according to the industry-standard SFF-8472 Multi Source Agreement (MSA). This feature gives an end user the ability to monitor real-time parameters of the SFP, such as optical output power, optical input power, temperature, laser bias current, and transceiver supply voltage.

The SFP transceiver 2200 includes a TOSA driver 2208 which is configured to interface to a Tx serial interface on the line card 2202. The TOSA driver 2208 provides the serial input to the PMD Tx TOSA 2204. The PMD Rx ROSA 2206 is configured to receive an optical signal and provide the received optical signal to a Rx pre-amp 2210 which interfaces to a Rx serial interface on the line card 2204. In conventional SFP transceivers 2200, the line card 2200 (or other host device) includes a CDR and clocked output, and this functionality is not included on the SFP transceiver 2200, i.e. the SFP transceiver 2200 does not include an internal reference clock. Additionally, the SFP transceiver 2200 includes an I2C management interface 2212 which interfaces to the line card 2202 to provide the DOM and other MSA-based communications. Note, in the SFP MSA, the I2C management interface 221 has very limited functions.

Figure 23:
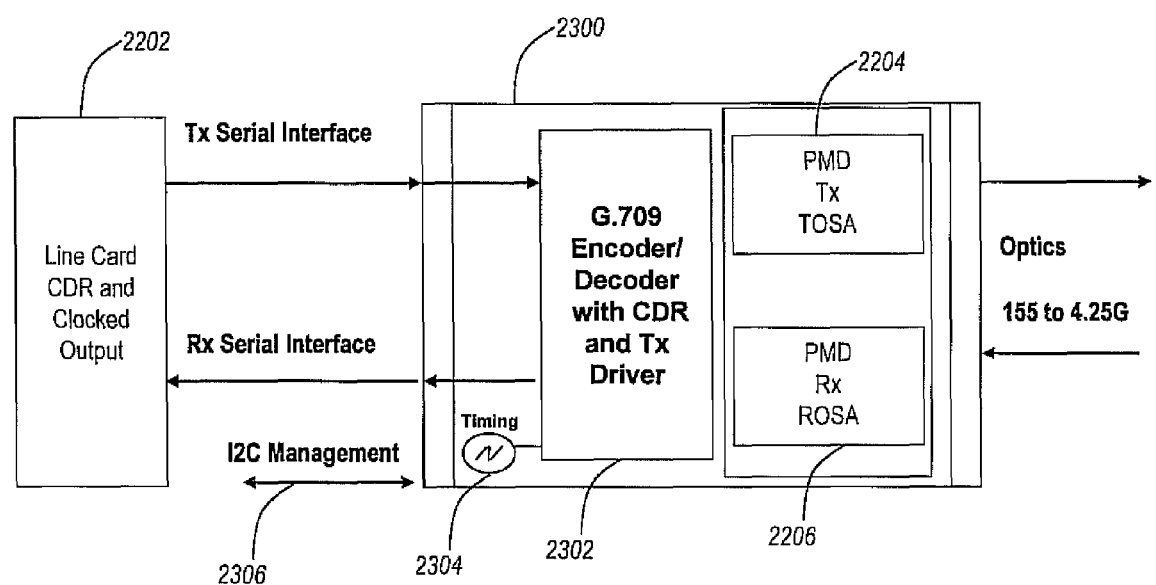
FIG. 23 is a block diagram of a SFP transceiver with integrated framing, FEC, and OAM&P functionality according to an exemplary embodiment of the present invention.

Referring to FIG. 23, a SFP transceiver 2300 is illustrated with integrated framing, FEC, and OAM&P functionality according to an exemplary embodiment of the present invention. The SFP transceiver 2300 is configured to provide G.709 framing, FEC, and OAM&P functionality within the SFP transceiver 2300 while preserving all of the SFP MSA specifications. The SFP transceiver 2300 is configured to interface to the line card 2202 or any other device configured according to the SFP MSA.

The SFP transceiver 2300 can include the same PMD Tx TOSA 2204 and PMD Tx ROSA 2206 as utilized in conventional SFP modules. Additionally, the SFP transceiver 2300 includes a G.709 encoder/decoder 2302, integrated timing 2304, and an advanced I2C management interface 2306. The G.709 encoder/decoder 2302 is utilized in place of the TOSA driver 2208 and Rx pre-amp 2210, and includes the same Tx driver and Rx pre-amp functionality. The G.709 encoder/decoder 2302 also includes an integrated CDR, and connects to the integrated timing 2304 for synchronization.

The G.709 encoder/decoder 2302 is configured to frame/un-frame a signal from/to the line card 2202. The framing utilizes G.709 to provide OAM&P and FEC integrated within the SFP transceiver 2300. The SFP transceiver 2300 is configured to frame any input signal from the line card 2202 within SFP specifications, i.e. 155 Mb/s to 4.25 Gb/s. This is done utilizing non-standard OTN rates described herein.

The I2C management interface 2306 can communicate standard MSA defined information to the line card 2202 as well as OAM&P information. For example, the line card can be configured to read unused registers on the SFP transceiver 2300 through the I2C management interface 2306 to interface to the overhead information. Alternatively, the line card 2202 does not have to interface with the overhead information as is the case in the demarcation application where the SFP transceiver 2300 is installed in a CPE device, and utilizes the closed loop communication channel to report OAM&P information to the far end.

Referring to FIG. 24, a table 2400 illustrates exemplary specifications for the SFP transceiver 2300 according to an exemplary embodiment of the present invention. The SFP transceiver 2300 conforms to the SFP MSA form factor, and can support bit rates from 155 Mb/s to 4.25 Gb/s which corresponds to OC-3 to 4 Gigabit Fibre Channel. The Tx can be any type including 1550 nm gray (uncooled), CWDM (uncooled), and DWDM. The Rx can include a PIN or avalanche photo diode (APD). The SFP transceiver 2300 has varying amounts of dispersion tolerance from 120 km to 360 km and associated link budgets from 20 dB to 32 dB. As described herein, the SFP transceiver 2300 can be used in any device capable of utilizing an SFP-compliant transceiver including Ethernet switches, IP routers, MSPPs, SAN directors, CPE demarcation, and the like.

Referring to FIG. 25, a table 2500 illustrates exemplary OTN bit rates utilized for various signal rates associated with SFP transceivers according to an exemplary embodiment of the present invention. The lowest standardized OTN bit rates are for 2.5 Gb/s signals. The present invention utilizes the same OTN framing structure with different, proprietary OTU bitrates. The present invention can utilize either 255/237 or 255/238 bit rates. The 255/237 bit rate can utilize an OTU2 type frame with 64 byte stuffing per OTU2 frame, and the 255/238 bit rate can utilize an OTU1 type frame without byte stuffing.

For example, an OC-3/STM-1 has an input bit rate into an SFP of 0.1555 Gb/s. The SFP transceiver 2300 is configured to frame the input OC-3/STM-1 into an OTN frame with a G.709 bit rate of 0.16733 Gb/s (255/237) or 0.16663 Gb/s (255/238). The overhead and FEC are utilized with the additional bit rate. The table 2500 also illustrates different bit rates for OC-12/STM-4, 1 G FC, 1 GbE, 2 G FC, OC-48/STM-16, and 4 G FC for both 255/237 and 255/238 bit rates.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A small form factor pluggable optical transceiver, comprising:
   an optical assembly;
   an encoder/decoder circuit connected to the optical assembly, wherein the encoder/decoder circuit is configured to frame/un-frame a client signal from/to a host device through the serial interface, wherein the client signal is framed/un-framed utilizing non-standard Optical Transport Network rates, and wherein the encoder/decoder circuit is further configured to provide operations, administration, maintenance, and provisioning functionality through overhead associated with the non-standard Optical Transport Network rates;
   a timing circuit connected to the encoder/decoder circuit, the timing circuit comprising an internal reference clock for the small form factor pluggable optical transceiver;
   a module housing comprising a serial interface connected to the encoder/decoder circuit, wherein the optical assembly, the encoder/decoder circuit, and the timing circuit are located within the module housing.

2. The small form factor pluggable optical transceiver of claim 1, wherein the small form factor pluggable optical transceiver is compliant to the small form factor pluggable multi-source agreement; and
   wherein the encoder/decoder circuit preserves specifications associated with the small form factor pluggable multi-source agreement.

3. The small form factor pluggable optical transceiver of claim 1, wherein the non-standard Optical Transport Network rates utilize one of 255/237 and 255/238 bit rates.

4. The small form factor pluggable optical transceiver of claim 3, wherein the 255/237 bit rate comprises an OTU2 type frame with 64 byte stuffing per OTU2 frame, and wherein the 255/238 bit rate comprises an OTU1 type frame without byte stuffing.

5. The small form factor pluggable optical transceiver of claim 1, wherein the encoder/decoder circuit is further configured to encode/decode forward error correction information on the framed/un-framed client signal.

6. The small form factor pluggable optical transceiver of claim 1, further comprising an I2C management interface configured to provide communication between the small form factor pluggable optical transceiver and the host device;
   wherein the encoder/decoder circuit is further configured to communicate operations, administration, maintenance, and provisioning information to/from the host device utilizing unused registers in the I2C management interface.

7. An encoder/decoder circuit integrated within a small form factor pluggable optical transceiver, comprising:
   a first interface connected to a serial interface, wherein the serial interface is configured to communicate a client signal from a host device;
   a second interface connected to an optical assembly, wherein the serial interface, the optical assembly, and the encoder/decoder circuit are contained within the small form factor pluggable optical transceiver; and
   circuitry connected to the first interface and the second interface, wherein the circuitry is configured to frame/ un-frame the client signal with an Optical Transport Network frame internally in the small form factor pluggable optical transceiver;

wherein the small form factor pluggable optical transceiver is compliant to the small form factor pluggable multi-source agreement; and wherein the encoder/decoder circuit preserves specifications associated with the small form factor pluggable multi-source agreement.

8. The encoder/decoder circuit of claim 7, wherein the client signal is framed/un-framed utilizing non-standard Optical Transport Network rates.

9. The encoder/decoder circuit of claim 8, wherein the non-standard Optical Transport Network rates utilize one of 255/237 and 255/238 bit rates.

10. The encoder/decoder circuit of claim 9, wherein the 255/237 bit rate comprises an OTU2 type frame with 64 byte stuffing per OTU2 frame, and wherein the 255/238 bit rate comprises an OTU1 type frame without byte stuffing.

11. The encoder/decoder circuit of claim 8, wherein the circuitry is further configured to encode/decode forward error correction information on the framed/un-framed client signal.

12. The encoder/decoder circuit of claim 11, further comprising an I2C management interface configured to provide communication between the small form factor pluggable optical transceiver and the host device;

wherein the circuitry is further configured to communicate operations, administration, maintenance, and provisioning information to/from the host device utilizing unused registers in the I2C management interface.

13. The encoder/decoder circuit of claim 8, wherein the circuitry is further configured to provide operations, administration, maintenance, and provisioning functionality through overhead associated with the non-standard Optical Transport Network rates.

14. A method of transporting a client signal with a small form factor pluggable optical transceiver, comprising:

operating an encoder/decoder circuit in the small form factor pluggable optical transceiver, the encoder/decoder circuit comprising:

a first interface connected to a serial interface, wherein the serial interface is configured to communicate a client signal from a host device;

a second interface connected to an optical assembly, wherein the serial interface, the optical assembly, and the encoder/decoder circuit are contained within the small form factor pluggable optical transceiver; and circuitry connected to the first interface and the second interface, wherein the circuitry is configured to frame/un-frame the client signal with an Optical Transport Network frame internally in the small form factor pluggable optical transceiver;

wherein the small form factor pluggable optical transceiver is compliant to the small form factor pluggable multi-source agreement; and wherein the encoder/decoder circuit preserves specifications associated with the small form factor pluggable multi-source agreement;

receiving at a serial interface a client signal from a host device;

framing the client signal in the Optical Transport Network frame utilizing a non-standard Optical Transport Network rate; and transmitting the framed client signal with an optical assembly.

15. The method of claim 14, further comprising:

encoding the framed client signal with forward error correction information;

wherein the encoding step preserves specifications associated with the small form factor pluggable multi-source agreement.

16. The method of claim 14, further comprising:

receiving a signal from the optical assembly;

unframing the received signal; and providing the unframed received signal to the serial interface;

wherein the unframing step preserves specifications associated with the small form factor pluggable multi-source agreement.

17. The method of claim 14, wherein the non-standard Optical Transport Network rates utilize one of 255/237 and 255/238 bit rates, wherein the 255/237 bit rate comprises an OTU2 type frame with 64 byte stuffing per OTU2 frame, and wherein the 255/238 bit rate comprises an OTU1 type frame without byte stuffing.

* * * * *